United States Patent
Yao et al.

(10) Patent No.: US 12,400,484 B2
(45) Date of Patent: Aug. 26, 2025

(54) LIVENESS DETECTION METHOD

(71) Applicant: Tencent Technology (Shenzhen) Company Limited, Guangdong (CN)

(72) Inventors: Taiping Yao, Shenzhen (CN); Keyue Zhang, Shenzhen (CN); Shouhong Ding, Shenzhen (CN); Jilin Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 492 days.

(21) Appl. No.: 17/993,246

(22) Filed: Nov. 23, 2022

(65) Prior Publication Data

US 2023/0082906 A1    Mar. 16, 2023

Related U.S. Application Data

(63) Continuation of application No. PCT/CN2022/088444, filed on Apr. 22, 2022.

(30) Foreign Application Priority Data

May 25, 2021 (CN) .......................... 202110569464.4

(51) Int. Cl.
  *G06V 40/40* (2022.01)
  *G06V 10/24* (2022.01)
  (Continued)

(52) U.S. Cl.
  CPC ............ *G06V 40/40* (2022.01); *G06V 10/247* (2022.01); *G06V 10/32* (2022.01); *G06V 10/764* (2022.01);
  (Continued)

(58) Field of Classification Search
  None
  See application file for complete search history.

(56) References Cited

U.S. PATENT DOCUMENTS

| | | | |
|---|---|---|---|
| 2019/0295302 A1 | 9/2019 | Fu et al. | |
| 2020/0279101 A1* | 9/2020 | Zhao | .................. G06T 7/11 |
| 2021/0209388 A1* | 7/2021 | Ciftci | .................. G06N 3/045 |

FOREIGN PATENT DOCUMENTS

| CN | 108549854 A | 9/2018 |
|---|---|---|
| CN | 111709409 A | 9/2020 |

(Continued)

OTHER PUBLICATIONS

International Search Report and Written Opinion in PCT/CN2022/088444, mailed Jun. 30, 2022, 12 pages.

(Continued)

*Primary Examiner* — Raphael Schwartz
(74) *Attorney, Agent, or Firm* — ArentFox Schiff LLP

(57) ABSTRACT

A liveness detection method is provided. In the method, image features are extracted from an image of a user. Convolution processing is performed on the image features through an estimation network to obtain a predicted mean value and a predicted variance of the image features. Standardization processing is performed on the image features based on the predicted mean value, the predicted variance, and predetermined network parameters of the standardization processing to obtain standardized features. Whether the image of the user includes a living body image is determined according to a liveness classification probability of a classification performed on the image of the user based on the standardized features. Apparatus and non-transitory computer-readable storage medium counterpart embodiments are also contemplated.

18 Claims, 12 Drawing Sheets

(51) Int. Cl.
  *G06V 10/32* (2022.01)
  *G06V 10/764* (2022.01)
  *G06V 10/774* (2022.01)
  *G06V 10/82* (2022.01)
  *G06V 40/16* (2022.01)
  *G06V 40/50* (2022.01)

(52) U.S. Cl.
  CPC ............ *G06V 10/774* (2022.01); *G06V 10/82* (2022.01); *G06V 40/161* (2022.01); *G06V 40/171* (2022.01); *G06V 40/50* (2022.01)

(56) References Cited

FOREIGN PATENT DOCUMENTS

| | | |
|---|---|---|
| CN | 112307450 A | 2/2021 |
| CN | 112668519 A | 4/2021 |
| CN | 112818722 A | 5/2021 |
| CN | 113033519 A | 6/2021 |
| WO | 2010078617 A1 | 7/2010 |

OTHER PUBLICATIONS

Liu, Yaohua, "Visual Place Recognition Based on Hard Example Mining and Domain Adaptation," A Thesis Submitted in Partial Fulfillment of the Requirements for the Degree for the Master of Engineering, Huazhong University of Science & Technology, May 2019, Wuhan, China. 74 pages (English Translation of Title page 2, English Translation of Abstract p. 6).
Office Action in CN202110569464.4, mailed Jul. 7, 2021, 12 pages.

\* cited by examiner

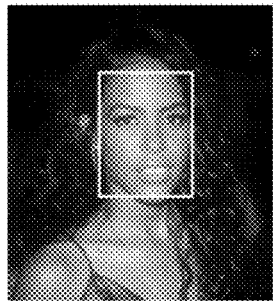 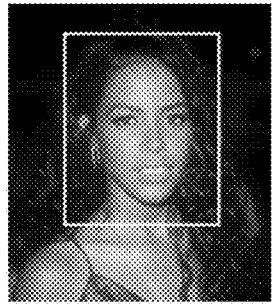  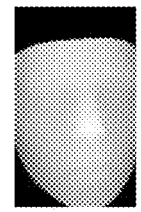
FIG. 12a  FIG. 12b  FIG. 12c  FIG. 12d
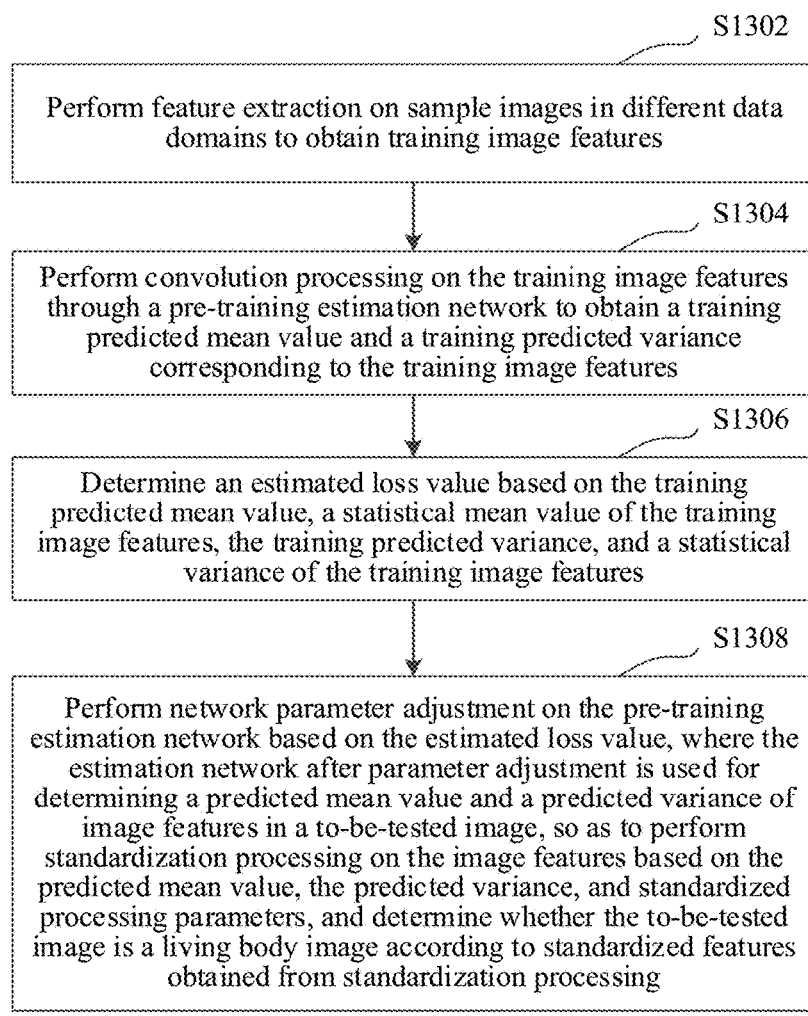
FIG. 13

LIVENESS DETECTION METHOD

RELATED APPLICATIONS

The present application is a continuation of International Application No. PCT/CN2022/088444, filed on Apr. 22, 2022, which claims priority to Chinese Patent Application No. 202110569464.4, entitled "LIVING BODY DETECTION METHOD, ESTIMATION NETWORK PROCESSING METHOD AND APPARATUS, AND COMPUTER DEVICE" and filed on May 25, 2021. The entire disclosures of the prior applications are hereby incorporated by reference in their entirety.

FIELD OF THE TECHNOLOGY

This application relates to the field of artificial intelligence technology, including to a living body detection method, an estimation network processing method and apparatus, a computer device, a storage medium, and a computer-readable instruction product.

BACKGROUND OF THE DISCLOSURE

With the development of artificial intelligence technology, living body detection technology has emerged, which is widely applied in bank remote services, face recognition payment, and access control systems. In the related living body detection technology, when performing living body detection, living body detection is performed on a to-be-tested image through a detection model trained from sample images, so as to determine whether the to-be-tested image is a living body image.

In practical applications, these to-be-tested images and sample images used in a training process have differences in domain information such as a face, lighting, background, and an attack type. That is, there can be a large difference in data distribution of the real to-be-tested images and the sample images. Therefore, the model generalization capability of the detection model may be insufficient, and when the detection model is used for performing living body detection, the accuracy of a detection result may be low.

SUMMARY

According to various embodiments of this disclosure, a living body detection method, an estimation network processing method, apparatus, and system, a computer device, a non-transitory computer-readable storage medium, and a computer-readable instruction product are provided.

According to an aspect of the present disclosure, a liveness detection method is provided. The liveness detection method may be performed by a computer device. In the method, image features are extracted from an image of a user. Convolution processing is performed on the image features through an estimation network to obtain a predicted mean value and a predicted variance of the image features. Standardization processing is performed on the image features based on the predicted mean value, the predicted variance, and predetermined network parameters of the standardization processing to obtain standardized features. Whether the image of the user includes a living body image is determined according to a liveness classification probability of a classification performed on the image of the user based on the standardized features.

According to an aspect of the present disclosure, a liveness detection system is provided. The liveness detection system includes processing circuitry that is configured to extract image features from an image of a user, and perform convolution processing on the image features through an estimation network to obtain a predicted mean value and a predicted variance of the image features. The processing circuitry is configured to perform standardization processing on the image features based on the predicted mean value, the predicted variance, and predetermined network parameters of the standardization processing to obtain standardized features. The processing circuitry is further configured to determine whether the image of the user includes a living body image according to a liveness classification probability of a classification performed on the image of the user based on the standardized features.

According to an aspect of the present disclosure, a computer device is provided. The computer device includes a memory and a processor, the memory storing computer-readable instructions, and the processor, when executing the computer-readable instructions, implementing the liveness detection method.

According to an aspect of the present disclosure, a non-transitory computer-readable storage medium is provided. The non-transitory computer-readable storage medium storing instructions which when executed by a processor cause the processor to perform the liveness detection method.

According to an aspect of the present disclosure, a computer-readable instruction product is provided. The computer-readable instruction product includes computer-readable instructions, the computer-readable instructions, when executed by a processor, performing the liveness detection method.

According to an aspect of the present disclosure, an estimation network processing method for liveness detection is provided. The estimation network processing method may be performed by a computer device. In the method feature extraction is performed on sample images in different data domains to obtain training image features. Convolution processing is performed on the training image features through a pre-training estimation network to obtain a training predicted mean value and a training predicted variance corresponding to the training image features. An estimated loss value is determined based on the training predicted mean value, a statistical mean value of the training image features, the training predicted variance, and a statistical variance of the training image features. Network parameter adjustment is performed on the pre-training estimation network based on the estimated loss value, where the estimation network after parameter adjustment is used for determining a predicted mean value and a predicted variance of image features in to-be-tested images, so as to perform standardization processing on the image features based on the predicted mean value, the predicted variance, and network parameters used for performing standardization processing on the estimation network, and determine whether the to-be-tested image is a living body image according to the obtained standardized features.

According to an aspect of the present disclosure, an estimation network processing apparatus for liveness detection is provided. The estimation network processing apparatus includes processing circuitry that is configured to perform feature extraction on sample images in different data domains to obtain training image features. The processing circuitry is configured to perform convolution processing on the training image features through a pre-training estimation network to obtain a training predicted mean value and a training predicted variance corresponding to the training image features. The processing circuitry is configured to determine an estimated loss value based on the training predicted mean value, a statistical mean value of the training image features, the training predicted variance, and a statistical variance of the training image features. Further, the processing circuitry is configured to perform network parameter adjustment on the pre-training estimation network based on the estimated loss value, where the estimation network after parameter adjustment is used for determining a predicted mean value and a predicted variance of image features in to-be-tested images, so as to perform standardization processing on the image features based on the predicted mean value, the predicted variance, and network parameters used for performing standardization processing on the estimation network, and determine whether the to-be-tested image is a living body image according to the obtained standardized features.

According to an aspect of the present disclosure, a computer device is provided. The computer device includes a memory and a processor, the memory storing computer-readable instructions, and the processor, when executing the computer-readable instructions, implement the estimation network processing method.

According to an aspect of the present disclosure, a non-transitory computer-readable storage medium is provided. The non-transitory computer-readable storage medium storing instructions which when executed by a processor cause the processor to perform the estimation network processing method.

According to an aspect of the present disclosure, a computer-readable instruction product is provided. The computer-readable instruction product includes computer-readable instructions, the computer-readable instructions, when executed by a processor, performing the estimation network processing method.

Details of one or more embodiments of this disclosure are provided in the subsequent accompanying drawings and descriptions. Other features, objectives, and advantages of this disclosure become apparent from the specification, the accompanying drawings, and the claims.

BRIEF DESCRIPTION OF THE DRAWINGS

To describe technical solutions in embodiments of this disclosure more clearly, the following briefly introduces the accompanying drawings for describing the embodiments. The accompanying drawings in the following description show only some embodiments of this disclosure, and other embodiments are within the scope of this disclosure.

FIG. 12a is a schematic diagram of a target region in a sample image according to an embodiment.

FIG. 12b is a schematic diagram of an enlarged target region in a sample image according to an embodiment.

FIG. 12c is a schematic diagram of a sample image after deleting a background region according to an embodiment.

FIG. 12d is a schematic diagram of a depth map label in a sample image according to an embodiment.

FIG. 13 is a schematic diagram of an estimation network processing method for living body detection according to an embodiment.

DESCRIPTION OF EMBODIMENTS

To make objectives, technical solutions, and advantages of this disclosure clearer, the following further describes this disclosure with reference to the accompanying drawings and the embodiments. It is to be understood that the specific embodiments described herein are only used for explaining this disclosure, and are not used for limiting this disclosure.

Figure 1:
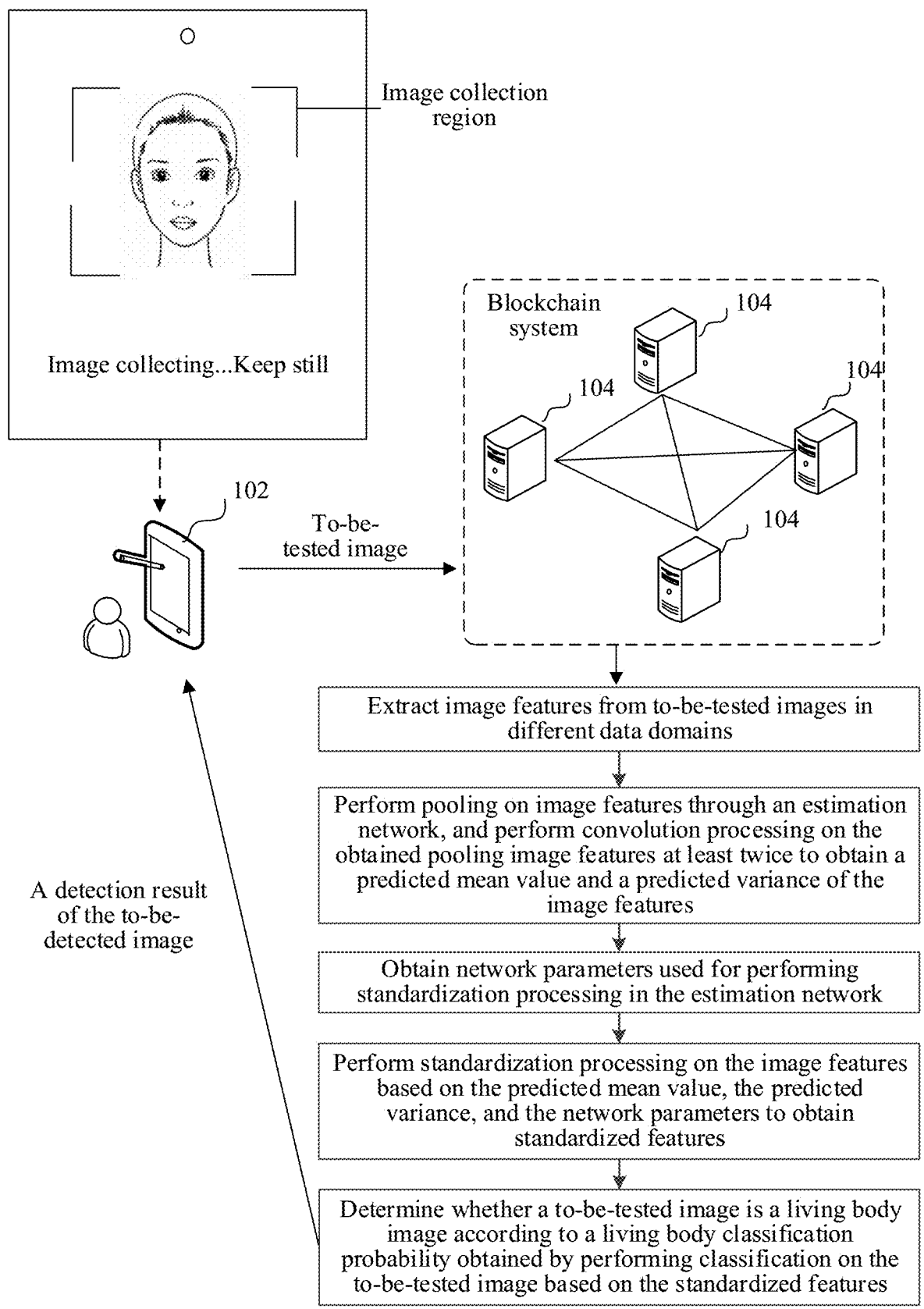
FIG. 1 is a diagram of an application environment of a living body detection method according to an embodiment.

The living body detection method provided in this disclosure may be applied to the application environment shown in FIG. 1. In the application environment, the terminal 102 communicates with the service device 104 through the network. Specifically, the service device 104 extracts image features from to-be-tested images in different data domains; and performs convolution processing on the image features through an estimation network to obtain a predicted mean value and a predicted variance of the image features. The service device 104 obtains network parameters used for performing standardization processing in the estimation network, performs standardization processing on the image features based on the predicted mean value, the predicted variance, and the network parameters to obtain standardized features, and determines whether the to-be-tested image is a living body image according to the standardized features.

The terminal 102 may be a smartphone, a tablet computer, a notebook computer, a desktop computer, a smart speaker, a smart watch, or the like, but is not limited thereto.

The service device 104 may be an independent physical server, or may be a server cluster including a plurality of service nodes in a blockchain system. A peer-to-peer (P2P) network is formed between the service nodes. The P2P protocol is an application-layer protocol running over the Transmission Control Protocol (TCP).

In addition, the service device 104 may further be a server cluster including a plurality of physical servers, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. In addition, the service device 104 may further be integrated with an access control system, and the service device 104 may perform living body detection on the to-be-tested image with reference to the access control system.

The terminal 102 may be connected to the service device 104 through a communication connection manner such as Bluetooth, Universal Serial Bus (USB), or a network, which is not limited in this disclosure.

Figure 2:
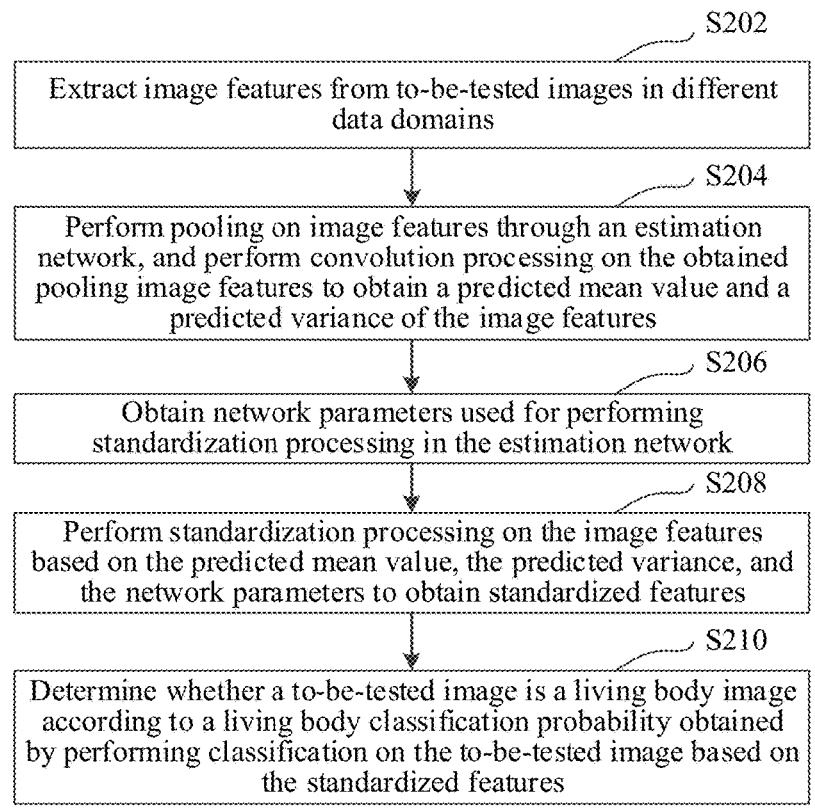
FIG. 2 is a schematic flowchart of a living body detection method according to an embodiment.

In an embodiment, as shown in FIG. 2, a living body detection (or liveness detection) method is provided, and a description is made by using an example in which the method is applied to the service device in FIG. 1, including the following steps.

In step S202, the service device extracts image features from to-be-tested images in different data domains.

Different data domains may refer to different image categories. The to-be-tested images in different data domains may include images of different categories collected in different application scenarios, such as images collected outdoors with strong light, images collected outdoors with weak light, images collected at night, and images collected indoors.

The to-be-tested image is an image on which living body detection is to be performed, which may be a color image or a grayscale image. When the to-be-tested image is the color image, the service device performs grayscale processing on the to-be-tested image. The to-be-tested image may include a face image of a to-be-tested object, and may further include a gesture action, an expression action, or a background region. The to-be-tested image may be images collected under various lighting conditions and backgrounds, and may also have various resolutions, sizes, or the like, which are not limited in this disclosure.

Living body, or liveness, detection is a technology for detecting whether the to-be-tested object included in the to-be-tested image is a living body, is usually used for determining whether the to-be-tested object in the to-be-tested image is a real living body user, and is frequently applied in identity verification scenarios. For example, when a virtual account is registered remotely through a mobile terminal, the service device that manages the virtual account needs to verify an identity of the user who requests to register the virtual account. For example, when a user a registers a virtual account, the service device may determine that the image is a living body image obtained by shooting the user a in real time through an image collected by a camera, rather than a non-living body image obtained by shooting an image of another person, a human body model, or a mask stolen by the user a.

Image features are the features or characteristics of the image that may be distinguished from other images, including features that may be intuitively felt and features that need to be transformed or processed. Features that may be intuitively felt, for example, may be features such as brightness, edge, texture, outline, and color; and features that may only be obtained by performing transformation or processing, such as a moment, a histogram, and a principal component.

In an embodiment, step S202 may specifically include the following: the service device obtains image features of the to-be-tested image by performing calculation through a feature extraction algorithm. For example, the service device may extract edge features of the to-be-tested image from the to-be-tested image through a Sobel operator, and the service device may also perform calculation on a seventh-order feature moment of the to-be-tested image through a seventh-order moment algorithm.

In another embodiment, step S202 may specifically include the following: the service device may further extract image features from the to-be-tested image through a neural network. The neural network may be, for example, a feed-forward neural network, a convolution neural network, a residual convolution neural network, a recurrent neural network, or the like.

In an embodiment, before extracting image features from the to-be-tested image, the service device may perform at least one preprocessing of grayscale processing, image enhancement processing, and denoising processing on the to-be-tested image.

To obtain the to-be-tested image, when the service device is an access control system, the service device may shoot a to-be-tested object in a target environment through an integrated camera to obtain the to-be-tested image.

When the service device is a server, the service device may establish a communication connection with a terminal, and then receive the to-be-tested image from a terminal side. The to-be-tested image may be an image collected by the terminal in a process of registering a virtual account, or an image collected during performing face recognition payment.

In step S204, the service device performs convolution processing on the image features through an estimation network to obtain a predicted mean value and a predicted variance of the image features.

The estimation network may be a neural network including a global pooling layer and at least two convolution layers, which are used for predicting a mean value and a variance of image features, or the like. Convolution processing refers to performing convolution calculation based on a convolution layer. The quantity of features of at least two convolution layers of the service device that performs convolution processing may be different.

In an embodiment, the service device performs convolution processing on the image features through a first convolution layer in the estimation network to obtain the first convolution features; and then, inputs first convolution features into a second convolution layer in the estimation network, performs convolution processing on the first convolution features through the second convolution layer to obtain the second convolution features, and so on, until a last convolution layer in the estimation network. The last convolution layer performs convolution processing on convolution features outputted by a previous convolution layer to obtain the predicted mean value and the predicted variance.

Figure 3:
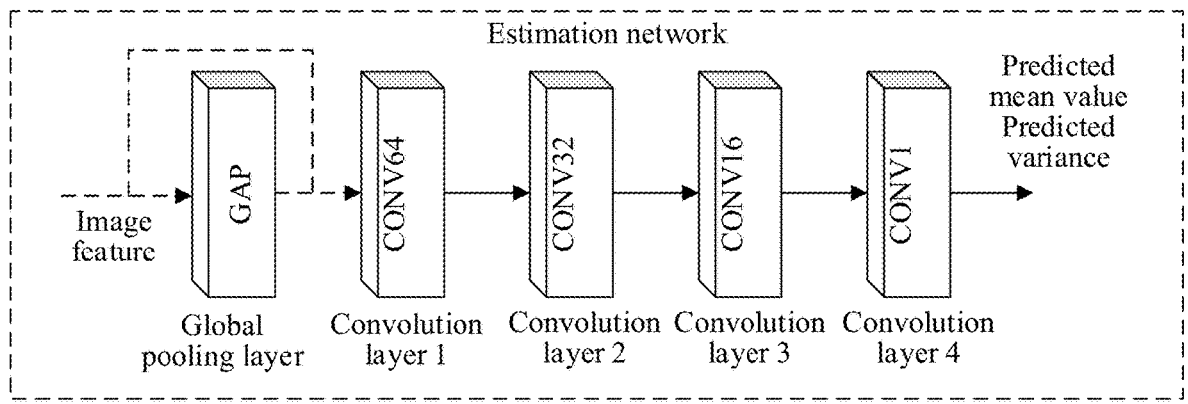
FIG. 3 is a schematic diagram of an estimation network according to an embodiment.

For example, as shown in FIG. 3, the estimation network includes four convolution layers, and a feature number decreases layer by layer from a convolution layer 1 (conv 64) to a convolution layer 4 (conv 1), that is, a feature number of the convolution layer 1 is 64, a feature number of a convolution layer 2 (conv 32) is 32, a feature number of a convolution layer 3 (conv 16) is 16, and a feature number of a convolution layer 4 is 1. Convolution calculation is performed on image features layer by layer through the convolution layer 1 to the convolution layer 4, and the convolution layer 4 outputs the predicted mean value and the predicted variance.

In an embodiment, step S204 may specifically include the following: the service device may first perform pooling on the image features through the estimation network, and then perform convolution processing on the obtained pooling image features to obtain the predicted mean value and the predicted variance of the image features.

Performing pooling on the image features may be performing downsampling on the image features to reduce data volume of the image features. Pooling includes global pooling and local pooling, and a method of pooling includes maximum pooling, average pooling, and random pooling.

In an embodiment, the service device first inputs the image features into a global pooling layer in the estimation network to obtain the pooling image features after performing global pooling processing on the image features. Then, the service device performs multi-layer convolution calculation on the pooling image features through a plurality of cascaded convolution layers to obtain the predicted mean value and the predicted variance of the image features. For example, as shown in FIG. 3, the service device may first input image features into a global average pooling (GAP) layer to perform global pooling processing, and then input the obtained pooling image features into the convolution layer 1, and input the output of the convolution layer 1 into the convolution layer 2, and so on, until the predicted mean value and the predicted variance outputted by the last convolution layer are obtained.

In step S206, the service device obtains network parameters used for performing standardization processing in the estimation network.

The network parameters are parameters used for performing standardization processing on image features in the estimation network, and the network parameters may be learned by training the estimation network based on the sample images. Through standardization processing, the service device may convert the image features into dimensionless pure numerical values in a specific interval, which facilitates unified processing on image features of different units or orders of magnitude.

In step S208, standardization processing on the image features is performed based on the predicted mean value, the predicted variance, and the network parameters to obtain standardized features.

In an embodiment, step S208 may specifically include the following: the service device may use the predicted mean value, the predicted variance, and the network parameters as parameters in a standardized processing algorithm, and use the image features as an independent variable of the standardized processing algorithm, thereby calculating the standardized features. The standardized processing algorithm includes, but is not limited to, a linear method, a broken-line method, a curvilinear method, or the like. The linear method may be, for example, an extreme value method, a standard deviation method, or the like; the broken-line method may be, for example, a three-line method, or the like; and the curvilinear method may be, for example, a seminormal distribution method, or the like.

In step S210, the service device determines whether the to-be-tested image is a living body image according to a living body classification probability obtained by performing classification on the to-be-tested image based on the standardized features.

A living body image may refer to an image including a living body object. If the to-be-tested image is a living body image, it indicates that the to-be-tested object in the to-be-tested image belongs to a living body object. For example, the image obtained by shooting the user by the camera is the living body image; and if the to-be-tested image is not a living body image (that is, the to-be-tested image is a non-living body image), it indicates that the to-be-tested object in the to-be-tested image is not a living body object.

For example, an image obtained by shooting a photo of the user or a mask worn by the user through a camera is not a living body image.

In an embodiment, step S210 may include the following: the service device may calculate a probability that the to-be-tested image is a living body image according to the standardized features, and when the probability that the to-be-tested image is a living body image is greater than a probability threshold, determine that the to-be-tested image is a living body image.

In another embodiment, step S210 may include the following: the service device inputs the standardized features into a classifier, to cause the classifier to perform classification on the to-be-tested image based on the standardized features to obtain the living body classification probability; the service device determines that the to-be-tested image is the living body image in a case that the living body classification probability reaches a preset threshold; and the service device determines that the to-be-tested image is a non-living body image in a case that the living body classification probability does not reach the preset threshold. Because the standardized features obtained by performing standardization processing on the image features according to the predicted mean value and the predicted variance predicted and obtained by the estimation network are more accurate, the living body classification probability obtained by the service device is more accurate, improving the accuracy of living body detection.

The classifier may include a two-class classifier, a multi-class classifier, a multi-task classifier, or the like, and is used for performing classification on the standardized features to obtain a classification result that whether the classifier is a living body image. The classifier may be based on a classifier constructed by a decision tree algorithm, a logistic regression algorithm, a naive Bayesian algorithm, or a neural network algorithm.

The classifier is obtained by training based on the standardized training features of the sample images, and specific training steps may include the following: the service device extracts training image features from the sample images, and then performs standardization processing on the training image features based on the predicted mean value, the predicted variance, and network parameters used for performing standardization processing on the pre-training estimation network to obtain standardized training features; and then inputs the standardized training features into the pre-training classifier to obtain the living body classification probability that whether the sample image is a living body image. The service device performs calculation on the classification loss value according to the living body classification probability and the label of the sample image, and adjusts parameters of the pre-training classifier according to the classification loss value, so as to obtain the final classifier.

The living body classification probability may be a value between [0, 1]. The preset threshold is a threshold set by the service device according to a detection requirement, and the service device may adjust the preset threshold according to an actual detection requirement.

Figure 4:
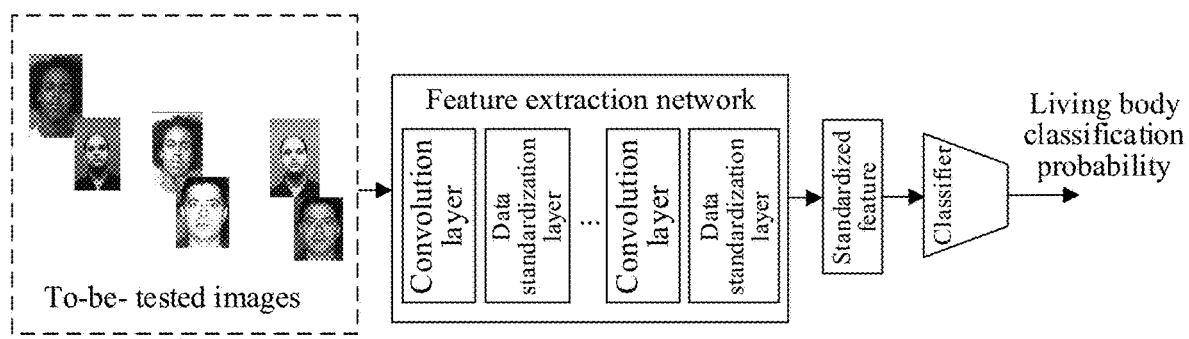
FIG. 4 is a schematic structural diagram of a living body detection method according to an embodiment.

Next, the embodiment is described with reference to FIG. 4, and the details are as follows:

The service device inputs the obtained to-be-tested image into a feature extraction network, and the feature extraction network includes a plurality of cascaded convolution layers and data standardization layers. The convolution layer is used for extracting the image features of the to-be-tested image, and the data standardization layer is used for performing data standardization on the features extracted by the convolution layer. The data standardization layer includes an estimation network. The estimation network performs pooling and convolution calculation on the image features to obtain the predicted mean value and the predicted variance. The service device first inputs the to-be-tested image into the convolution layer of the feature extraction network, and performs convolution calculation on the to-be-tested image through the convolution layer to extract the image features of the to-be-tested image. Then, the service device inputs the image features into the estimation network in the data standardization layer, the estimation network performs pooling on the image features, and performs convolution processing on the obtained pooling image features at least twice to obtain the predicted mean value and the predicted variance of the image features.

Then, the data standardization layer performs normalization processing on the image features based on the predicted mean value and the predicted variance, and performs affine transformation on the normalized features based on the linear transformation parameters and the translation parameters to obtain the standardized features.

The service device inputs the standardized features into the next convolution layer to perform feature extraction again, and then performs standardization processing through the data standardization layer. The processing is performed a plurality of times to obtain the final standardized features, and the finally obtained standardized features are inputted into the classifier to obtain the living body classification probability.

In the foregoing embodiment, the mean value and the variance of the extracted image features are predicted through the estimation network to obtain the predicted mean value and the predicted variance of the image features, so as to avoid using the mean value and the variance of the data standardization layer during model training. It is beneficial to perform standardization processing on the to-be-tested images obtained from different scenarios based on the predicted mean value and the predicted variance obtained by prediction, and to perform living body detection according to the obtained standardized features. In this way, the universality of living body detection is improved, and the accuracy of living body detection for to-be-tested images in different data domains is improved. In addition, during performing standardization processing, standardization processing is performed on the image features by further combining the network parameters used for performing standardization processing in the estimation network with the predicted mean value and the predicted variance. Because the network parameters in the estimation network are parameters obtained after model training, the obtained standardized features are more conducive to living body detection and improve the accuracy of performing living body detection on the to-be-tested image.

In an embodiment, the network parameters include linear transformation parameters and translation parameters, and step S208 includes the following: the service device performs normalization processing on the image features according to the predicted mean value and the predicted variance to obtain normalized features; and the service device performs affine transformation on the normalized features based on the linear transformation parameters and the translation parameters to obtain the standardized features.

The normalization processing refers to scaling the image features to a preset scale, that is, causing the mean value of the image features to be 0 and the variance to be a unit variance. For different images, data distribution of image features is different, for example, the brightness of different images is different; or the contrast of different images is different, that is, a difference of brightness levels between the brightest region and the darkest region of the image is relatively large. The normalization processing may reduce the influence of differences in data distribution on the extracted image features. In an embodiment, the service device performs calculation on the difference between the image features before normalization processing and the predicted mean value, and then calculates a difference between the obtained difference and the predicted variance to obtain the normalized features. For example, the service device performs normalization processing on the image features by formula (1). x is an image feature before normalization processing, μ is a predicted mean value, σ is a predicted variance, and x' a normalized feature.

$$x' = \frac{x - \mu}{\sigma}, \qquad (1)$$

where
affine transformation is a mapping method that maps the normalized features from one vector space to another vector space through linear transformation and translation. The affine transformation is linear transformation from two-dimensional coordinates to two-dimensional coordinates, and may maintain the straightness and translation of a two-dimensional graphic, that is, a relative positional relationship between straight lines may be maintained unchanged. Parallel lines are still parallel lines after affine transformation, and position orders of points on the lines do not change. The linear transformation parameters are parameters that perform linear transformation on the normalized features in a process of performing affine transformation. The translation parameters are the parameters that perform translation on the normalized features in the process of performing affine transformation. In an embodiment, the service device performs affine transformation on the normalized features by formula (2). x' is a normalized feature, γ is a linear transformation parameter, and β is a translation parameter.

$$\bar{x} = \gamma x' + \beta \qquad (2)$$

Figure 5:
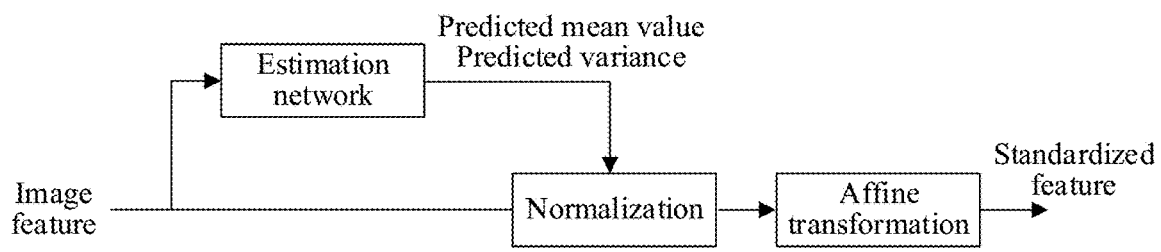
FIG. 5 is a schematic principle diagram of standardization processing according to an embodiment.

In an embodiment, as shown in FIG. 5, the service device inputs the image features into the estimation network to obtain the predicted mean value and the predicted variance of the image features through the estimation network. Then, the service device performs normalization processing on the image features according to the predicted mean value and the predicted variance to obtain normalized features. After obtaining the normalized features, the service device performs affine transformation on the normalized features through the linear transformation parameters and the translation parameters to obtain the standardized features.

In the foregoing embodiment, the service device performs normalization processing on the image features according to the predicted mean value and the predicted variance, and performs affine transformation on the normalized features to obtain the standardized features. Standardized processing is performed on the image features relative to a statistical mean value and a statistical variance obtained by performing mathematical statistics on the sample images. The method of performing standardization processing on image features according to the predicted mean value and the predicted variance reduces the influence of the difference in the data distribution of the real to-be-tested image and the sample image on a process of standardization processing, and the obtained standardized features have higher accuracy, so that the living body detection result obtained according to the standardized features is more accurate.

In another embodiment, step S208 may specifically include the following: the service device obtains a statistical mean value and a statistical variance of training image features, where the training image features are image features extracted from the sample image; the service device performs weighted calculation on the predicted mean value and the statistical mean value to obtain a weighted mean value; the service device performs weighted calculation on the predicted variance and the statistical variance to obtain a weighted variance; and the service device performs standardization processing on the image features according to the weighted mean value, the weighted variance, and the network parameters to obtain the standardized features.

The sample images may be images of different data domains extracted from a training image set. For example, the service device respectively extracts a plurality of living body images and a plurality of non-living body images of different data domains from the training image set. The to-be-tested object in the living body image and the to-be-tested object in the non-living body image may be the same living body object, or may not be the same living body object. For the sample images of different data domains, the data distribution may be different. For example, the sample images of different data domains have different brightness, contrast, and attack types. Sample images of the attack type may refer to an image collected by a user by using a paper photo, a photo displayed on a display screen, or a manner of wearing a mask when collecting images in real time.

A statistical mean value is a mean value obtained by performing calculation on the training image features of the sample image. A statistical variance is a variance obtained by performing calculation on the training image features of the sample image. The predicted mean value and the predicted variance are the mean value and the variance of the to-be-tested image obtained by performing estimation by the estimation network. Because the estimation network is obtained by training the sample image, when the data distribution difference of the to-be-tested image and the sample image is relatively great, the predicted mean value and the predicted variance may also be relatively close to the real mean value and the variance of the to-be-tested image.

The weighted calculation performed by the service device on the predicted mean value and the statistical mean value may refer to: respectively performing weighted calculation on the predicted mean value and the statistical mean value by using different weight values, and then performing summation on a result obtained by performing weighted calculation. The service device performs weighted calculation on the predicted variance and the statistical variance: respectively performing weighted calculation on the predicted variance and the statistical variance with different weight values, and then performing summation on a result obtained by performing weighted calculation. The service device performs standardization processing on the image features by using the weighted mean value and the weighted variance obtained by weighted calculation and network parameters, so that service device may obtain relatively accurate standardized features when the data distribution difference of the to-be-tested image and the sample image is relatively large or small, and the stability and accuracy of the living body detection result are improved.

In an embodiment, when the service device performs the weighted calculation, the weight values corresponding to the predicted mean value and the statistical mean value, and the respective weight values of the predicted variance and the statistical variance may be adjusted as required. The weights corresponding to the predicted mean value, the statistical mean value, the predicted variance, and the statistical variance may be the same or different.

In the foregoing embodiment, the weighted mean value obtained by the service device fuses the predicted mean value and the statistical mean value, and the weighted variance fuses the predicted variance and the statistical variance. Therefore, regardless of the data distribution difference of the to-be-tested image and the sample image is relatively large or small, relatively accurate standardized features may be obtained, and the stability and accuracy of the living body detection result are improved. The service device extracts sample images from a plurality of sample image sets in different data domains. The extracted sample images have various different data distributions, and the obtained statistical mean value and the statistical variance have stronger generalization performance, so that the standardized features obtained by the service device according to the weighted mean value and weighted variance are more accurate, and the accuracy of the living body detection result is improved.

In an embodiment, the to-be-tested image is an image collected by a client in response to an interaction request; and the living body detection method further includes: in a case that the interaction request is a resource account registration request and the to-be-tested image is the living body image, generating resource account information, and feeding back the resource account information to the client; in a case that the interaction request is a resource transfer request and the to-be-tested image is the living body image, transferring a specified amount of resources in the resource transfer request; and in a case that the interaction request is a request for turning on an access switch and the to-be-tested image is the living body image, turning on the access switch.

The interaction request is a request triggered by the user through a client to obtain a business service provided by the service device. A resource account registration request is a request to apply to a service device to register a resource account. A resource account is an account that may interact with virtual resources, and the virtual resources include, but are not limited to, virtual currency and a virtual item. The resource transfer request is a request that applies to the service device to transfer the virtual resources, and the transfer includes transfer in and transfer out. The request for turning on the access switch is a request that applies to the service device for turning on the access switch.

Figure 6:
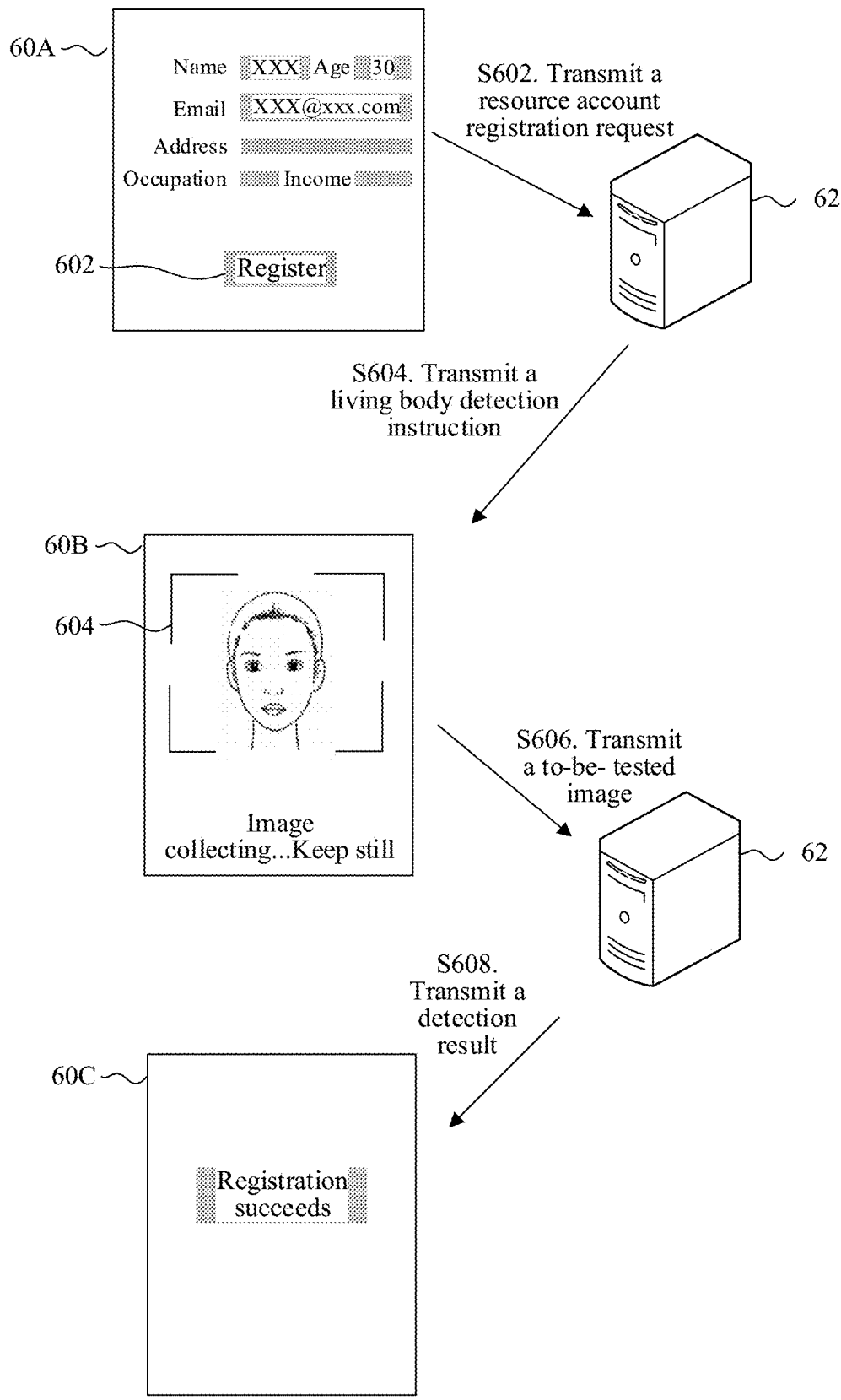
FIG. 6 is a schematic diagram of an application of a living body detection method according to an embodiment.

In an embodiment, the client is an application that provides a financial service. As shown in FIG. 6, a registration initiation page 60A of the client includes a registration button 602. When the user clicks the registration button 602, the client generates a resource account registration request to request a service device 62 to register a resource account. The service device performs living body detection before registering a resource account. A specific process is as follows:

In step S602, a client transmits a resource account registration request to a service device 62.

In step S604, a service device transmits a living body detection instruction to the client in response to the resource account registration request, so as to instruct the client to collect a face image of a to-be-tested object.

In response to the living body detection instruction, the client displays an image collection frame 604 in an image collection page 60B, so as to collect a to-be-tested image of the to-be-tested object in the image collection frame 604. The client performs S606 after collecting the to-be-tested image through an image collection device.

In step S606, the client transmits the to-be-tested image to the service device 62.

The service device 62 extracts image features from the to-be-tested image, performs pooling on the image features through the estimation network to obtain pooling image features, and performs convolution processing on the pooling image features at least twice to obtain a predicted mean value and a predicted variance of the image features. The service device 62 performs normalization processing on the image features according to the predicted mean value and the predicted variance to obtain normalized features, and performs affine transformation on the normalized features based on linear transformation parameters and translation parameters to obtain standardized features. Finally, the service device 62 inputs the standardized features into a classifier, to cause the classifier to perform classification on the to-be-tested image based on the standardized feature to obtain the living body classification probability. It is determined that the to-be-tested image is the living body image in a case that the living body classification probability reaches a preset threshold; and it is determined that the to-be-tested image is a non-living body image in a case that the living body classification probability does not reach the preset threshold, so as to obtain a detection result that whether the to-be-tested image is a living body image.

In step S608, the service device 62 transmits the detection result to the client, and simultaneously transmits resource account information when the to-be-tested image is the living body image. After receiving the resource account information, the client performs registration according to the resource account information, and displays a registration result on a result display page 60C.

In the foregoing embodiment, the service device performs living body detection on the to-be-tested object that requests to register a resource account, and when it is determined that the to-be-tested image is the living body image, that is, when it is determined that the to-be-tested object is the living body object, generates the resource account information, and feeds back resource account information to the client to register the resource account. In this way, it may effectively prevent an illegal user from posing as a legal user to register the resource account, ensure legal use of the resource account, and improve the registration efficiency of the resource account relative to that of the manually registered resource account.

Figure 7:
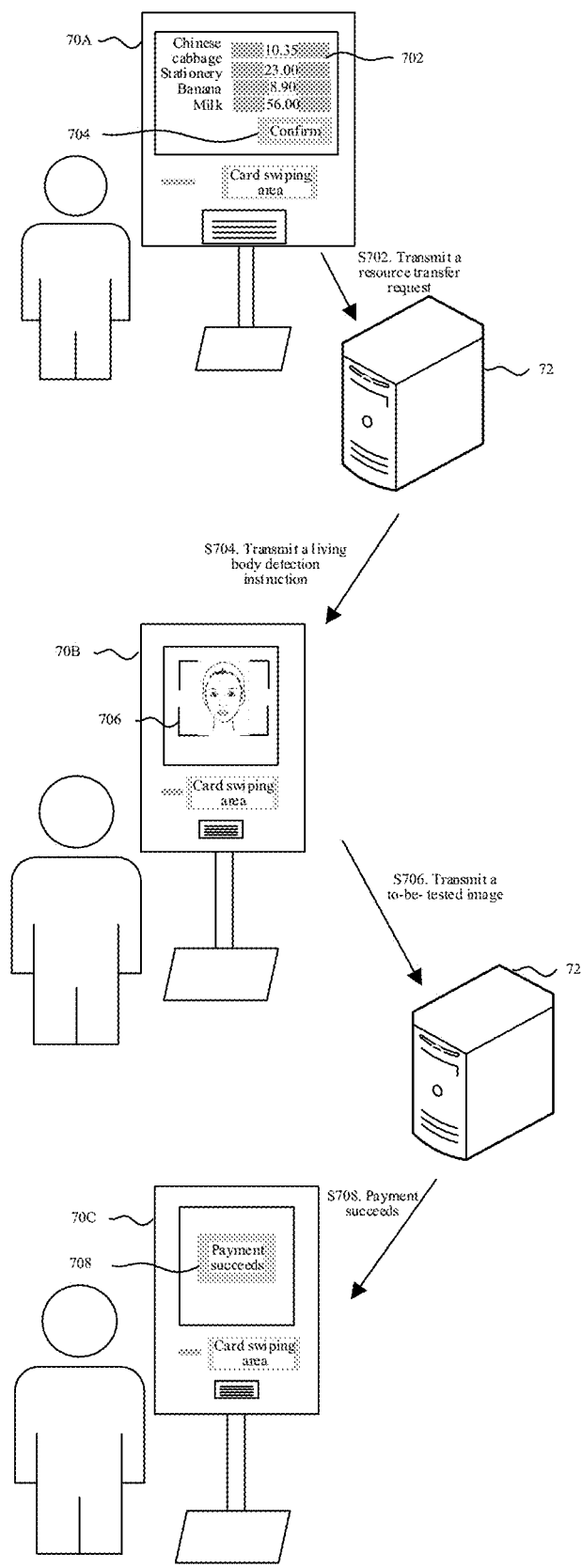
FIG. 7 is a schematic diagram of an application of a living body detection method according to another embodiment.

In an embodiment, the client is a payment application, and the interaction request is a resource transfer request. As shown in FIG. 7, a payment request page 70A of the client includes a payment list 702 and a payment control 704. When the user clicks the payment control 704, the client generates a resource transfer request to request the service device 72 to perform resource transfer. The service device performs living body detection before resource transfer. A specific process is as follows:

In step S702, a client transmits a resource transfer request to a service device 72.

In step S704, the service device 72 transmits a living body detection instruction to the client in response to the resource transfer request, so as to instruct the client to collect a face image of a to-be-tested object.

In response to the living body detection instruction, the client displays an image collection frame 706 on an image collection page 70B, so as to collect a to-be-tested image of the to-be-tested object in the image collection frame 706. The client performs S706 after collecting the to-be-tested image through an image collection device.

In step S706, the client transmits the to-be-tested image to the service device 72.

The service device 72 extracts image features from the to-be-tested image, performs pooling on the image features through the estimation network to obtain pooling image features, and performs convolution processing on the pooling image features at least twice to obtain a predicted mean value and a predicted variance of the image features. The service device 72 performs normalization processing on the image features according to the predicted mean value and the predicted variance to obtain normalized features, and performs affine transformation on the normalized features based on linear transformation parameters and translation parameters to obtain standardized features. Finally, the service device 72 inputs the standardized features into a classifier, to cause the classifier to perform classification on the to-be-tested image based on the standardized feature to obtain the living body classification probability. It is determined that the to-be-tested image is the living body image in a case that the living body classification probability reaches a preset threshold; and it is determined that the to-be-tested image is a non-living body image in a case that the living body classification probability does not reach the preset threshold.

When the service device determines that the to-be-tested image is the living body image, the service device transfers a specified amount of resources in the resource transfer request, and performs S708.

In step S708, the service device 72 transmits payment success information to the client. The client displays the payment success information 708 on the result display page 70C.

In the foregoing embodiment, the service device performs living body detection on the to-be-tested object that requests to perform resource transfer, and when it is determined that the to-be-tested image is the living body image, that is, when it is determined that the to-be-tested object is the living body object, transfers a specified amount of resources in the resource transfer request, which ensures the security of the resource transfer and improves the efficiency of resource transfer.

Figure 8:
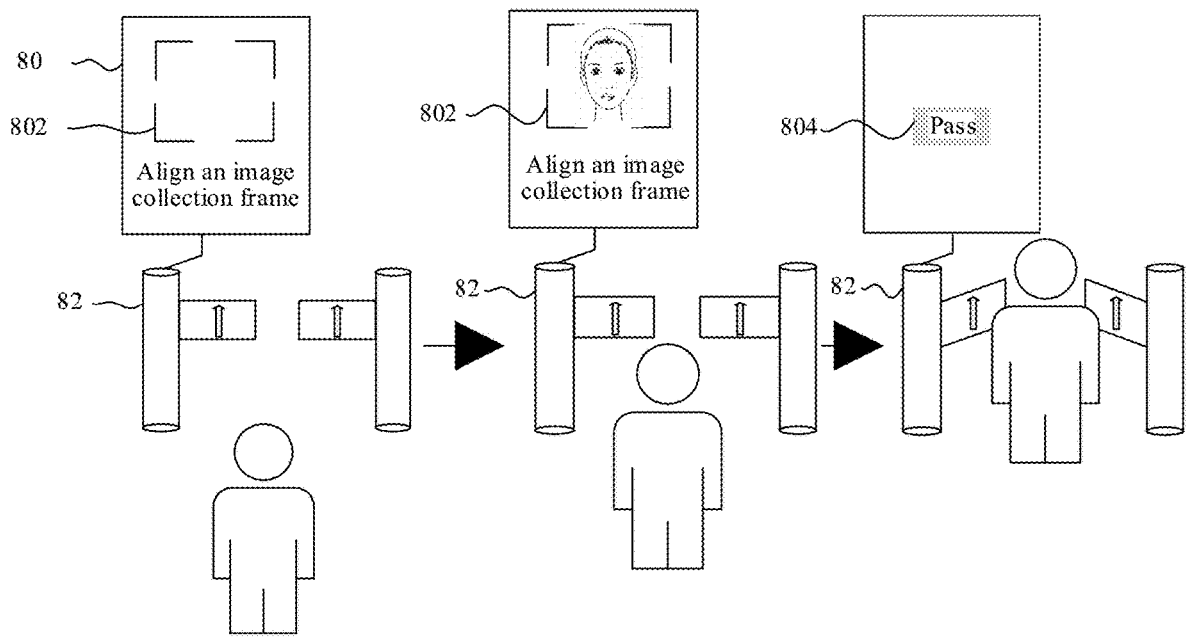
FIG. 8 is a schematic diagram of an application of a living body detection method according to another embodiment.

In an embodiment, the client is an access control system, and the interaction request is the request for turning on the access switch. As shown in FIG. 8, when to-be-tested object approaches a gate 82 in which the access control system is installed, the access control system is triggered to perform living body detection on the to-be-tested object. The access control system displays an image collection frame 802 on an access switch control page 80, so as to collect the to-be-tested image of the to-be-tested object through the image collection frame 802.

When the access control system collects the to-be-tested image through the camera, the access control system transmits the to-be-tested image to the service device (that is, the gate 82 in which the access control system is installed). The service device extracts image features from the to-be-tested image, performs pooling on the image features through the estimation network to obtain pooling image features, and performs convolution processing on the pooling image features at least twice to obtain a predicted mean value and a predicted variance of the image features. The service device performs normalization processing on the image features according to the predicted mean value and the predicted variance to obtain normalized features, and performs affine transformation on the normalized features based on linear transformation parameters and translation parameters to obtain standardized features. Finally, the service device inputs the standardized features into a classifier, to cause the classifier to perform classification on the to-be-tested image based on the standardized feature to obtain the living body classification probability. It is determined that the to-be-tested image is the living body image in a case that the living body classification probability reaches a preset threshold; and it is determined that the to-be-tested image is a non-living body image in a case that the living body classification probability does not reach the preset threshold. Then, the service device transmits a result that the to-be-tested image is a living body image or a non-living body image to the access control system, so that when the access control system determines that the to-be-tested image is the living body image, the access switch is turned on and information 804 allowing passage is displayed on the access switch control page; and when the access control system determines that the to-be-tested image is the non-living body image, the access switch is not turned on.

In the foregoing embodiment, living body detection is performed on the to-be-tested object that requests to turn on the access switch to verify the identity of the to-be-tested object. When the to-be-tested image is the living body image, the access switch is turned on, which ensures the security of the access control system, and saves costs and improves passage efficiency compared with manually verifying the to-be-tested object.

Figure 9:
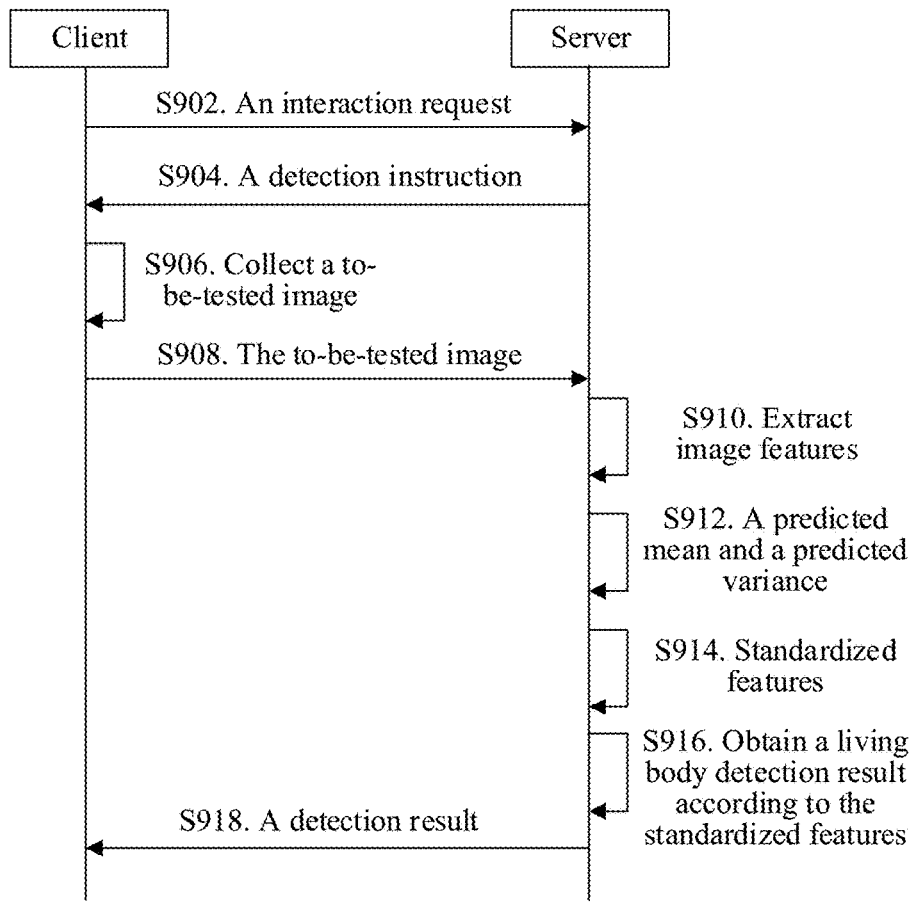
FIG. 9 is a timing diagram of a living body detection method according to an embodiment.

In an embodiment, as shown in FIG. 9, the living body detection method includes the following steps:

In step S902, a client transmits an interaction request to a service device.

The client may be an application installed on a terminal, such as a social application, a payment application, a shopping application, or another application that provides financial services. In addition, the client may further be an access control system installed on the service device.

In step S904, the service device transmits a detection instruction to the client in response to the interaction request.

In step S906, the client collects a to-be-tested image for the to-be-tested object according to the detection instruction.

In step S908, the client transmits the to-be-tested image to the service device.

In step S910, when the service device obtains the to-be-tested image, the service device extracts image features from the to-be-tested image.

In step S912, the service device performs pooling on the image features through the estimation network, and performs convolution processing on the obtained pooling image features at least twice to obtain the predicted mean value and the predicted variance of the image features.

In step S914, the service device performs normalization processing on the image features according to the predicted mean value and the predicted variance to obtain normalized features, and performs affine transformation on the normalized features based on linear transformation parameters and translation parameters to obtain standardized features.

In step S916, the service device inputs the standardized features into a classifier, to cause the classifier to perform classification on the to-be-tested image based on the standardized feature to obtain the living body classification probability, and determines whether the to-be-tested image is a living body image according to the standardized features.

In step S918, the service device transmits the living body detection result of the to-be-tested object to the client.

Figure 10:
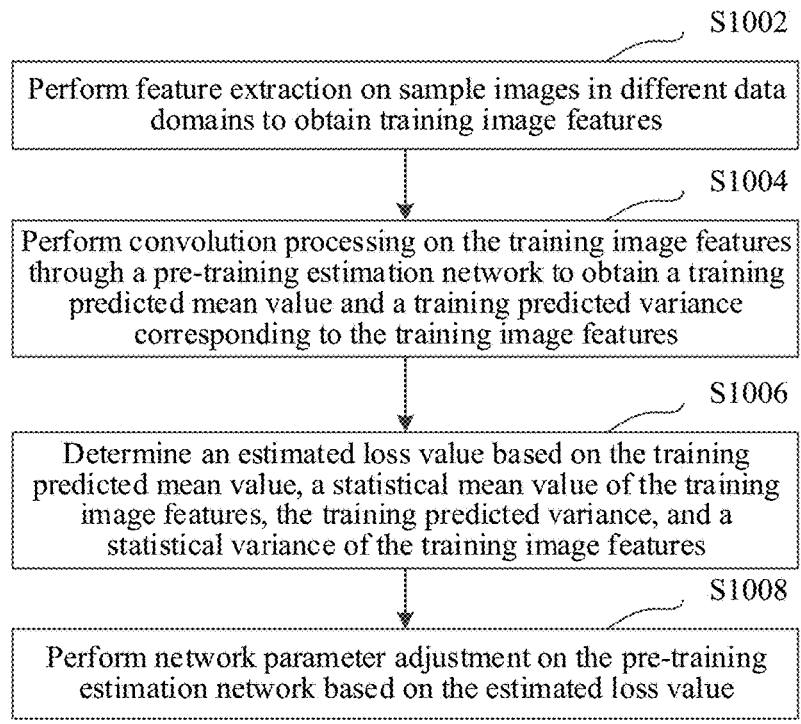
FIG. 10 is a schematic flowchart of a living body detection method according to another embodiment.

In an embodiment, as shown in FIG. 10, the estimation network is obtained by training a pre-training estimation network; and the service device trains the pre-training estimation network, including the following steps:

In step S1002, the service device performs feature extraction on sample images in different data domains to obtain training image features.

The sample images in different data domains may be: sample images of different categories collected in different application scenarios, such as sample images collected outdoors with strong light, sample images collected outdoors with weak light, sample images collected at night, and sample images collected indoors.

The sample images may be images of different data domains extracted from a training image set. For example, the service device respectively extracts a plurality of living body sample images and a plurality of non-living body sample images in different data domains from the training image set. The to-be-tested object in the living body sample image and the to-be-tested object in the non-living body sample image may be the same living body object, or may not be the same living body object.

Training image features are the features or characteristics of the sample image that may be distinguished from other sample images, including features that may be intuitively felt and features that need to be transformed or processed. Features that may be intuitively felt, for example, may be features such as brightness, edge, texture, outline, and color; and features that may only be obtained by performing transformation or processing, such as a moment, a histogram, and a principal component.

In an embodiment, step S1002 may specifically include the following: the service device obtains training image features of the sample images through a feature extraction algorithm. For example, the service device may extract edge features of the sample image from the sample image through a Sobel operator, and the service device may also perform calculation on a seventh-order feature moment of the sample image through a seventh-order moment algorithm.

In another embodiment, step S1002 may specifically include the following: the service device may further extract training image features from the sample image through a neural network. The neural network may be, for example, a feedforward neural network, a convolution neural network, a residual convolution neural network, a recurrent neural network, or the like.

In an embodiment, before extracting training image features from the sample image, the service device may perform at least one preprocessing of grayscale processing, image enhancement processing, and denoising processing on the sample image.

In step S1004, the service device performs convolution processing on the training image features through a pre-training estimation network to obtain a training predicted mean value and a training predicted variance corresponding to the training image features.

In an embodiment, the service device performs convolution processing on the training image features through a first convolution layer in the pre-training estimation network to obtain the first convolution training features; and then, inputs the first convolution training features into a second convolution layer in the pre-training estimation network, performs convolution processing on the first convolution training features through the second convolution layer to obtain the second convolution training features, and so on, and performs convolution processing on the input convolution training features through other convolution layers in the pre-training estimation network to obtain the training predicted mean value and the training predicted variance.

In an embodiment, step S1004 may specifically include the following: the service device may first perform pooling on the training image features through the pre-training estimation network, and then perform convolution processing on the obtained training pooling image features to obtain the training predicted mean value and the training predicted variance of the training image features.

Performing pooling on the training image features may be performing downsampling on the training image features to reduce data volume of the training image features. Pooling includes global pooling and local pooling, and a method of pooling includes maximum pooling, average pooling, and random pooling.

In an embodiment, the service device first inputs the training image features into a global pooling layer in the pre-training estimation network to obtain the pooling image features after performing global pooling processing on the training image features. Then, the service device performs multi-layer convolution calculation on the training pooling image features through a plurality of cascaded convolution layers to obtain the training predicted mean value and the training predicted variance of the training image features.

In step S1006, the service device determines an estimated loss value based on the training predicted mean value, a statistical mean value of the training image features, the training predicted variance, and a statistical variance of the training image features.

The statistical mean value is a mean value of the training image features obtained by mathematical calculation, and the statistical variance is a variance of the training image features obtained by mathematical calculation.

In an embodiment, step S1006 may specifically include the following: the service device calculates a difference or a squared difference between the training predicted mean value and the statistical mean value of the training image features, and the difference or the squared difference between the training predicted variance and the statistical variance of the training image features, and uses a sum of the two differences or a sum of the two squared differences as an estimated loss value.

In another embodiment, step S1006 may specifically include calculating a difference between the training predicted mean value and the statistical mean value of the training image features, and a difference between the training predicted variance and the statistical variance of the training image features, then respectively calculating squares of the two differences, and using a sum of the two squares as an estimated loss value. For example, the service device calculates the estimated loss value according to formula (3), where $L_{mve}$ is an estimated loss value, $\mu$ is a predicted mean value, $\tilde{\mu}$ is a statistical mean value, $\sigma^2$ is a predicted variance, and a $\widetilde{\sigma^2}$ is a statistical variance.

$$L_{mve}=(\mu-\tilde{\mu})^2+(\sigma^2-\widetilde{\sigma^2})^2 \qquad (3)$$

In step S1008, the service device performs network parameter adjustment on the pre-training estimation network based on the estimated loss value.

In an embodiment, after the service device obtains the estimated loss value, the estimated loss value may be back-propagated in the estimation network to obtain a gradient of the network parameters in each network layer of the estimation network. The network parameters in the estimation network are adjusted based on the obtained gradient to minimize the estimated loss value obtained from the adjusted estimation network.

In the foregoing embodiment, the service device performs network parameter adjustment on the estimation network through the estimated loss value, which improves the capability of the predicted mean value and the variance in the estimation network and the generalization capability of the estimation network, so that the predicted mean value and the predicted variance obtained by the estimation network by prediction are as close as possible to the real mean value and the variance of the to-be-tested image. When the service device obtains the to-be-tested image, standardization processing may be performed on the image features of the to-be-tested image by directly using the predicted mean value and the predicted variance obtained by the estimation network by prediction. In addition, when the data distribution of the to-be-tested image and the sample image are different, due to the relatively strong generalization capability of the estimation network, compared with applying samples and variances obtained from the sample images by calculation, the service device may obtain more accurate standardized features according to the predicted mean value and the predicted variance, which improves the accuracy of living body detection. The service device performs global pooling on the training image features through the pre-training estimation network, which reduces the data volume of the training image features and avoids overfitting during performing parameter adjustment on the pre-training estimation network, so that the predicted mean value and the predicted variance obtained by the estimation network by prediction obtained by network parameter adjustment are more accurate, thereby improving the accuracy of living body detection.

In an embodiment, the service device performs standardization processing on the training image features based on the predicted mean value, the predicted variance, and network parameters used for performing standardization processing on the pre-training estimation network to obtain standardized training features; the service device inputs the normalized training features into a pre-training classifier, to cause the pre-training classifier to perform classification on the sample image based on the standardized training features to obtain a sample classification probability; the service device performs calculation on the sample classification probability and a label of the sample image to obtain a classification loss value; and the service device performs network parameter adjustment on the classifier and the estimation network based on the classification loss value and the estimated loss value.

Through standardization processing, the service device converts the training image features into dimensionless pure numerical values in a specific interval, which facilitates unified processing on image features of different units or orders of magnitude.

In an embodiment, the service device may use the predicted mean value, the predicted variance, and the network parameters used for performing standardization processing as parameters in the pre-training estimation network as parameters in a standardized processing algorithm, and use the image features as an independent variable of the standardized processing algorithm, thereby calculating the standardized features.

In an embodiment, the service device may perform calculation on the label of the sample image and a classification result of the sample image by the classifier through a logarithmic loss function to obtain the classification loss value.

In another embodiment, the service device performs calculation on a cross entropy between the classification result of the sample images by the classifier and the label of the sample image to obtain the classification loss value by calculation according to the expectation of the obtained cross entropy.

In another embodiment, the service device first performs feature extraction on the sample image by using the feature extraction network, and then inputs the standardized features obtained by the feature extraction into the classifier to perform classification on the sample image by the classifier according to the standardized features. The service device takes a logarithm of the classification result obtained by the classification, performs calculation on the cross entropy between the classification result and the label of the sample image to obtain the classification loss value by calculation according to the expectation of the cross entropy. For example, the service device obtains the classification loss value by calculation by formula (4). X is a set of sample images, Y is a set of labels of sample images, x is a sample image, y is a label of a sample image x. G is to perform feature extraction on x through the feature extraction network to obtain the standardized features of x. C is a classification result obtained by performing classification on x according to the standardized features by the classifier. $-\mathbb{E}_{(x,y)\sim(X,Y)}$ refers to traversing all sample images, calculating a loss between the label of the sample image and the classification result obtained by the classifier, and then taking the average, that is, calculating the expectation of the classification loss.

$$L_{cls}(X,Y;G,C)=-\mathbb{E}_{(x,y)\sim(X,Y)}\Sigma_{k=1}^{K}\mathbb{1}\,[k=y]\log C(G(x)) \quad (4)$$

In the foregoing embodiment, the service device performs network parameter adjustment on the pre-training classifier and the estimation network according to the classification loss value, to cause the predicted mean value and the predicted variance obtained by the estimation network by prediction obtained by network parameter adjustment and the living body classification probability obtained by the classifier after network parameter adjustment to be more accurate, thereby improving the accuracy of living body detection. In addition, after extracting the training image features of the sample images, the service device performs standardization processing on the training image features through the predicted mean value and the predicted variance, thereby avoiding the problems of descent of a gradient and disappearance of a gradient in a process of adjusting the estimation network and the classified network parameters.

In an embodiment, the service device obtains a depth map label of the sample image; performs depth feature extraction on the standardized training features to obtain a depth feature map; performs calculation on the depth feature map and the depth map label to obtain a depth map loss value; and performs network parameter adjustment on the pre-training estimation network based on the depth map loss value and the estimated loss value.

The depth map label is a label used for labelling the sample image. The depth feature map is an image that may describe the depth features of the sample image obtained by performing depth feature extraction on the standardized training features through the depth estimation network.

In an embodiment, the service device calculates a difference between the depth feature map and the depth map label of the sample image, and then uses a square of the difference as the depth map loss value.

In another embodiment, the service device respectively calculates a square between the depth feature map and the depth map label of the sample image, and then uses a difference between the two squares as the depth map loss value.

In another embodiment, the service device calculates the difference between the depth feature map and the depth map label of the sample image, and then calculates a norm of the difference to obtain the depth map loss value. For example, the service device obtains the depth map loss value by calculation according to formula (5), where $L_{dep}(X;dep)$ is a depth map loss value, X is a set of sample images, I is a depth map label of the sample image, and D is a depth feature map obtained by performing depth feature extraction on the standardized training features of X.

$$L_{dep}(X;dep)=\|dep(D(X))-I\|_{2}^{2} \quad (5)$$

In an embodiment, the service device obtains a scale-invariant feature transform (SIFT) label of the sample image, and performs SIFT feature estimation on the standardized training features to obtain SIFT estimated features. The service device obtains a SIFT loss value according to the SIFT estimated features and the SIFT label; and performs network parameter adjustment on the pre-training estimation network based on the SIFT loss value and the estimated loss value.

In an embodiment, after obtaining the depth map loss value and the classification loss value, the service device may perform back-propagation on the depth map loss value in the depth estimation network, and perform back-propagation on the classification loss value in the feature extraction network to obtain the gradient of the network parameters in each network layer of the feature extraction network and the depth estimation network. The service device adjusts the estimation network in the feature extraction network and the network parameters of the depth estimation network based on the obtained gradient, to cause a sum of the depth map loss value and the classification loss value obtained from the adjusted estimation network and the depth estimation network to be minimized. In this way, the accuracy of the predicted mean value and the predicted variance obtained by the estimation network by prediction and the living body classification probability of the to-be-tested image obtained by calculation by the classifier to be improved, and the accuracy of the living body detection result is improved.

In an embodiment, the service device obtains the estimated loss value, the depth map loss value, and the classification loss value by calculation, and then adjusts the network parameters in the feature extraction network, the network parameters of the classifier, and the network parameters of the depth estimation network to minimize a sum of the estimated loss value, the depth map loss value, and the classification loss value, so that the accuracy of the predicted mean value and the predicted variance obtained by the estimation network by prediction and the living body classification probability of the to-be-tested images obtained by the classifier by calculation is improved, and the accuracy of the living body detection result is improved.

In an embodiment, the service device performs depth feature extraction on the standardized training features through the depth estimation network to obtain a depth feature map. The service device obtains standardized training features through the feature extraction network, and then obtains the estimated loss value, the depth map loss value, and the classification loss value by calculation. The service device may perform network parameter adjustment on the depth estimation network and simultaneously perform network parameter adjustment on the feature extraction network and the classifier according to the estimated loss value, the depth map loss value, and the classification loss value; and the service device may also separately train the depth estimation network through training samples, so as to adjust the network parameters on the depth estimation network.

Figure 11:
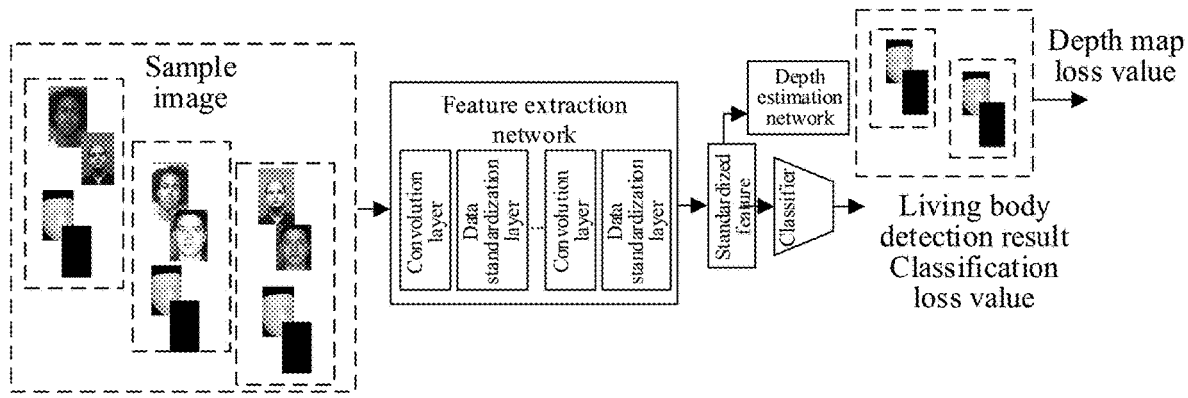
FIG. 11 is a schematic structural diagram of a living body detection method according to an embodiment.

In an embodiment, as shown in FIG. 11, the service device obtains sample images, where the sample images include a living body sample image and a non-living body sample image; performs depth map calculation on the sample images to obtain the depth map label of the sample image in a case that the sample image is the living body sample image; and in a case that the sample image is the non-living body sample image, uses a black base image with the same size as the depth map label of the sample image. The service device inputs the sample image into the feature extraction network, extracts the training sample features of the sample image through the convolution layer in the feature extraction network, then inputs the features outputted by the convolution layer into a data standardization layer connected to the convolution layer, and performs data standardization processing on the features outputted by the convolution layer through the data standardization layer. The service device then inputs the standardized features into the next convolution layer, and so on, until the last data standardization layer. The service device inputs the standardized features outputted by the last data standardization layer of the feature extraction network into the classifier to obtain the living body detection result through the classifier. In addition, the service device inputs the standardized features into the depth estimation network, and performs depth feature extraction on the standardized features through the depth estimation network to obtain a depth feature map. The service device obtains the classification loss value by calculation according to the living body detection result outputted by the classifier and the label of the sample image, and obtains the depth map loss value by calculation according to the depth feature map and the depth map label of the sample image. The service device adjusts the network parameters of the feature extraction network and the classifier to minimize the sum of the depth map loss value and the classification loss value. In an embodiment, the service device determines an estimated loss value based on the training predicted mean value, a statistical mean value of the training image features, the training predicted variance, and a statistical variance of the training image features. The service device adjusts the network parameters of the feature extraction network and the classifier to minimize the sum of the depth map loss value, the classification loss value, and the estimated loss value.

In an embodiment, the sample image includes the living body sample image and the non-living body sample image; the obtaining the depth map label of the sample image includes: performing depth map calculation on the sample image to obtain the depth map label in a case that the sample image is the living body sample image; and in a case that the sample image is the non-living body sample image, generating a black base image with a same size as the sample image and using the black base image as the depth map label.

A living body sample image may refer to a sample image including a living body object. If the sample image is a living body image, it indicates that the to-be-tested object in the sample image belongs to a living body object. For example, the sample image obtained by shooting the user by the camera is the living body image; and if the sample image is a non-living body sample image, it indicates that the to-be-tested object in the sample image is not a living body object. For example, a sample image obtained by shooting a photo of the user or the user wearing a mask through a camera is a non-living body sample image.

In an embodiment, the service device calculates the disparity of each pixel in the sample image to obtain the depth map label of the sample image according to the disparity of each pixel. In another embodiment, the service device performs depth calculation on the sample image through the neural network obtained by training to obtain the depth map label of the sample image.

In the foregoing embodiment, the sample image includes a living body sample image and a non-living body sample image, and the service device obtains a depth map label for the sample image and the non-living body sample image respectively. Then, the service device may obtain the depth loss value through the depth map label of the sample image and the depth feature map of the sample image estimated by the depth estimation network by calculation, and train the estimation network and the depth estimation network in the feature extraction network through the depth loss value, so as to improve the accuracy of the predicted mean value and the predicted variance estimated by the estimation network, thereby improving the accuracy of the living body detection result.

In an embodiment, the service device performs face recognition on the sample image to obtain a target region including face features; the service device deletes, in the sample image, an image region outside the target region; and the service device obtains a depth map label of the sample image after deleting the image region.

Face recognition is a technology that detects face regions in images based on face feature information. The service device performs face recognition on the sample image to obtain a target region including face features as shown in a box in FIG. 12a. In an embodiment, after obtaining a target region, the service device expands the target region to obtain more background content, and the expanded target region is as shown in FIG. 12b. Then, the service device deletes an image region outside the target region, or the service device may also delete the image region outside the expanded target region. The service device deletes the image region outside the target region in a white box in FIG. 12b to obtain an image as shown in FIG. 12c. If the sample image in FIG. 12a is a living body sample image, the service device performs depth map calculation on the image shown in FIG. 12c to obtain a depth map label as shown in FIG. 12d.

In an embodiment, before the service device performs face recognition on the sample image, if the sample image is a color image, the service device performs grayscale processing on the sample image, and a grayscale processing algorithm includes a component method, a maximum value method, an average value method, and a weighted average method.

In an embodiment, the service device performs image enhancement processing on the sample image before performing face recognition on the sample image. The image enhancement processing algorithm includes a spatial domain method and a frequency domain method.

In an embodiment, as shown in FIG. 13, an estimation network processing method for living body detection is provided, and a description is made by using an example in which the method is applied to the service device in FIG. 1, including the following steps:

In step S1302, the service device performs feature extraction on sample images in different data domains to obtain training image features.

In step S1304, the service device performs convolution processing on the training image features through a pre-training estimation network to obtain a training predicted mean value and a training predicted variance corresponding to the training image features.

In step S1306, the service device determines an estimated loss value based on the training predicted mean value, a statistical mean value of the training image features, the training predicted variance, and a statistical variance of the training image features.

In step S1308, the service device performs network parameter adjustment on the pre-training estimation network based on the estimated loss value, where the estimation network after parameter adjustment is used for determining a predicted mean value and a predicted variance of image features in to-be-tested images, so as to perform standardization processing on the image features based on the predicted mean value, the predicted variance, and network parameters used for performing standardization processing on the estimation network, and determine whether the to-be-tested image is a living body image according to standardized features obtained from standardization processing.

In an embodiment, the service device performs standardization processing on the training image features based on the predicted mean value, the predicted variance, and network parameters used for performing standardization processing on the pre-training estimation network to obtain standardized training features; inputs the normalized training features into a pre-training classifier, to cause the pre-training classifier to perform classification on the sample images based on the standardized training features to obtain a sample classification probability; and performs calculation on the sample classification probability and a label of the sample image to obtain a classification loss value; and step S1308 may specifically include the following: the service device performs network parameter adjustment on the classifier and the estimation network based on the classification loss value and the estimated loss value.

In an embodiment, the service device obtains a depth map label of the sample image; performs depth feature extraction on the standardized training features to obtain a depth feature map; and performs calculation on the depth feature map and the depth map label to obtain a depth map loss value; and step S1308 may specifically include the following: the service device performs network parameter adjustment on the pre-training estimation network based on the depth map loss value and the estimated loss value.

In an embodiment, the sample image of the service device includes the living body sample image and the non-living body sample image; and the obtaining the depth map label of the sample image includes: performing depth map calculation on the sample image to obtain the depth map label in a case that the sample image is the living body sample image; and in a case that the sample image is the non-living body sample image, generating a black base image with a same size as the sample image and using the black base image as the depth map label.

In an embodiment, the service device performs face recognition on the sample image to obtain a target region including face features; deletes, in the sample image, an image region outside the target region; and the service device obtains a depth map label of the sample image after deleting the image region.

For exemplary steps of the S1302 to S1308, reference may be made to the embodiment in FIG. 2 and the embodiment in FIG. 10.

It is to be understood that although each step of the flowcharts in FIG. 2, FIG. 6, FIG. 10, and FIG. 13 is shown sequentially according to arrows, the steps are not necessarily performed according to an order indicated by arrows. Unless clearly specified in this specification, there is no strict sequence limitation on the execution of the steps, and the steps may be performed in another sequence. In addition, at least some steps in FIG. 2, FIG. 6, FIG. 10, and FIG. 13 may include a plurality of steps or a plurality of stages. The steps or the stages are not necessarily performed at the same moment, and instead may be performed at different moments. A performing sequence of the steps or the stages is not necessarily performed in sequence, and instead may be performed in turn or alternately with another step or at least some of substeps or stages of the another step.

Figure 14:
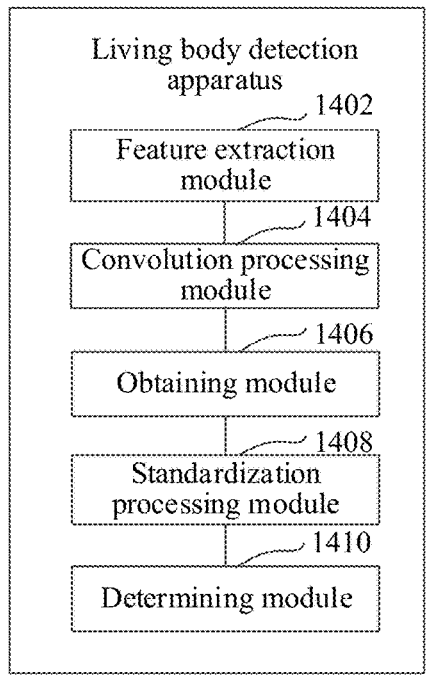
FIG. 14 is a structural block diagram of a living body detection apparatus according to an embodiment.

In an embodiment, as shown in FIG. 14, a living body detection apparatus is provided. The apparatus may use a software module or a hardware module, or a combination of the two to become a part of a computer device. The apparatus specifically includes: a feature extraction module 1402, a convolution processing module 1404, an obtaining module 1406, a standardization processing module 1408, and a determining module 1410. One or more modules, submodules, and/or units of the apparatus can be implemented by processing circuitry, software, or a combination thereof, for example.

The feature extraction module 1402 is configured to extract image features from to-be-tested images in different data domains. The convolution processing module 1404 is configured to perform convolution processing on the image features through an estimation network to obtain a predicted mean value and a predicted variance of the image features. The obtaining module 1406 is configured to obtain network parameters used for performing standardization processing in the estimation network. The standardization processing module 1408 is configured to perform standardization processing on the image features based on the predicted mean value, the predicted variance, and the network parameters to obtain standardized features. The determining module 1410 is configured to determine whether the to-be-tested image is a living body image according to a living body classification probability obtained by performing classification on the to-be-tested image based on the standardized features.

In the living body detection method, the estimation network processing method and apparatus, the computer device, the storage medium, and the computer-readable instruction product, the mean value and the variance of the extracted image features are predicted through the estimation network to obtain the predicted mean value and the predicted variance of the image features, so as to avoid using the mean value and the variance of the data standardization layer during model training. It is beneficial to perform standardization processing on the to-be-tested images obtained from different scenarios based on the predicted mean value and the predicted variance obtained by prediction, and to perform living body detection according to the obtained standardized features. In this way, the universality of living body detection is improved, and the accuracy of living body detection for to-be-tested images in different data domains is improved. In addition, during performing standardization processing, standardization processing is performed on the image features by further combining the network parameters used for performing standardization processing in the estimation network with the predicted mean value and the predicted variance. Because the network parameters in the estimation network are parameters obtained after model training, the obtained standardized features are more conducive to living body detection and improve the accuracy of performing living body detection on the to-be-tested image.

In an embodiment, the network parameters include linear transformation parameters and translation parameters; the standardization processing module 1408 is further configured to perform normalization processing on the image features according to the predicted mean value and the predicted variance to obtain normalized features; and perform affine transformation on the normalized features based on the linear transformation parameters and the translation parameters to obtain the standardized features.

In an embodiment, the standardization processing module 1408 is further configured to obtain a statistical mean value and a statistical variance of training image features, where the training image features are image features extracted from sample images; perform weighted calculation on the predicted mean value and the statistical mean value to obtain a weighted mean value; perform weighted calculation on the predicted variance and the statistical variance to obtain a weighted variance; and perform standardization processing on the image features according to the weighted mean value, the weighted variance, and the network parameters to obtain the standardized features.

In an embodiment, the determining module 1410 is further configured to input the standardized features into a classifier, to cause the classifier to perform classification on the to-be-tested image based on the standardized feature to obtain the living body classification probability; determine that the to-be-tested image is the living body image in a case that the living body classification probability reaches a preset threshold; and determine that the to-be-tested image is a non-living body image in a case that the living body classification probability does not reach the preset threshold.

Figure 15:
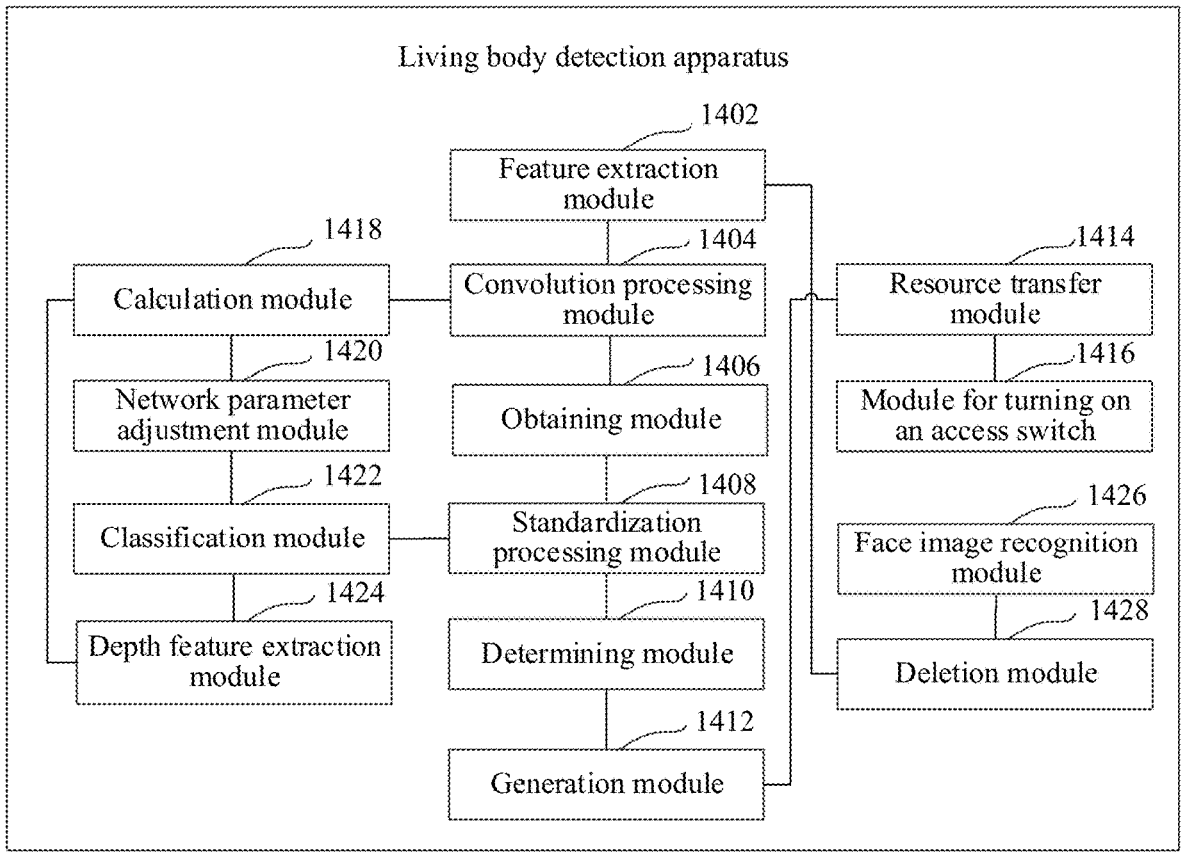
FIG. 15 is a structural block diagram of a living body detection apparatus according to another embodiment.

In an embodiment, the to-be-tested image is an image collected by a client in response to an interaction request; and as shown in FIG. 15, the apparatus further includes a generation module 1412, a resource transfer module 1414, and a module for turning on an access switch 1416.

The generation module 1412 is configured to, in a case that the interaction request is a resource account registration request and the to-be-tested image is the living body image, generate resource account information, and feed back the resource account information to the client. The resource transfer module 1414 is configured to transfer, in a case that the interaction request is a resource transfer request and the to-be-tested image is the living body image, a specified amount of resources in the resource transfer request. The module for turning on an access switch 1416 is configured to turn on, in a case that the interaction request is a request for turning on an access switch and the to-be-tested image is the living body image, the access switch.

In an embodiment, the estimation network is obtained by training a pre-training estimation network; and the apparatus further includes a feature extraction module 1402, a convolution processing module 1404 a calculation module 1418, and a network parameter adjusting module 1420.

The feature extraction module 1402 is configured to perform feature extraction on sample images in different data domains to obtain training image features. The convolution processing module 1404 is configured to perform convolution processing on the training image features through a pre-training estimation network to obtain a training predicted mean value and a training predicted variance corresponding to the training image features. The calculation module 1418 is configured to determine an estimated loss value based on the training predicted mean value, a statistical mean value of the training image features, the training predicted variance, and a statistical variance of the training image features. The network parameter adjusting module 1420 is configured to perform network parameter adjustment on the pre-training estimation network based on the estimated loss value.

In an embodiment, the apparatus further includes a standardization processing module 1408, a classification module 1422, a calculation module 1418, and a network parameter adjusting module 1420.

The standardization processing module 1408 is further configured to perform standardization processing on the training image features based on the predicted mean value, the predicted variance, and network parameters used for performing standardization processing on the pre-training estimation network to obtain standardized training features. The classification module 1422 is configured to input the normalized training features into a pre-training classifier, to cause the pre-training classifier to perform classification on the sample images based on the standardized training features to obtain a sample classification probability. The calculation module 1418 is further configured to perform calculation on the sample classification probability and a label of the sample image to obtain a classification loss value. The network parameter adjusting module 1420 is further configured to perform network parameter adjustment on the pre-training classifier and the estimation network based on the classification loss value.

In an embodiment, the apparatus further includes an obtaining module 1406, a depth feature extraction module 1424, a calculation module 1418, and a network parameter adjusting module 1420.

The obtaining module 1406 is further configured to obtain a depth map label of the sample image. The depth feature extraction module 1424 is configured to perform depth feature extraction on the standardized training features to obtain a depth feature map. The calculation module 1418 is further configured to perform calculation on the depth feature map and the depth map label to obtain a depth map loss value. The network parameter adjusting module 1420 is further configured to perform network parameter adjustment on the pre-training estimation network based on the depth map loss value and the estimated loss value.

In an embodiment, the sample image includes the living body sample image and the non-living body sample image; the obtaining module 1406 is further configured to perform depth map calculation on the sample image to obtain the depth map label in a case that the sample image is the living body sample image; and in a case that the sample image is the non-living body sample image, generating a black base image with a same size as the sample image and using the black base image as the depth map label.

In an embodiment, the apparatus further includes a face recognition module 1426, a deletion module 1428, and an obtaining module 1406.

The face recognition module 1426 is configured to perform face recognition on the sample image to obtain a target region including face features. The deletion module 1428 is configured to delete, in the sample image, an image region outside the target region. The obtaining module 140 is further configured to obtain a depth map label of the sample image after deleting the image region.

For an exemplary limitation on the living body detection apparatus, refer to the limitation on the living body detection method above. Details are not described herein again. The modules in the foregoing living body detection apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

Figure 16:
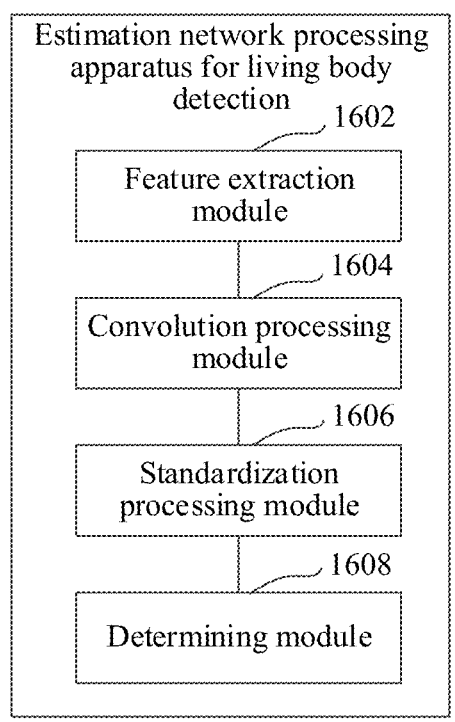
FIG. 16 is a structural block diagram of an estimation network processing apparatus for living body detection according to an embodiment.

In an embodiment, as shown in FIG. 16, an estimation network processing apparatus for living body detection is provided. The apparatus may use a software module or a hardware module, or a combination of the two to become a part of a computer device. The apparatus specifically includes: a feature extraction module 1602, a convolution processing module 1604, a standardization processing module 1606, and a determining module 1608. One or more modules, submodules, and/or units of the apparatus can be implemented by processing circuitry, software, or a combination thereof, for example.

The feature extraction module 1602 is configured to perform feature extraction on sample images in different data domains to obtain training image features. The convolution processing module 1604 is configured to perform convolution processing on the training image features through a pre-training estimation network to obtain a training predicted mean value and a training predicted variance corresponding to the training image features. The standardization processing module 1606 is configured to determine an estimated loss value based on the training predicted mean value, a statistical mean value of the training image features, the training predicted variance, and a statistical variance of the training image features. The determining module 1608 is configured to perform network parameter adjustment on the pre-training estimation network based on the estimated loss value, where the estimation network after parameter adjustment is used for determining a mean value and a variance of image features in to-be-tested images, so as to perform standardization processing on the image features based on the mean value, the variance, and network parameters used for performing standardization processing on the estimation network, and determine whether the to-be-tested image is a living body image according to standardized features obtained from standardization processing.

In the living body detection method, the estimation network processing method and apparatus, the computer device, the storage medium, and the computer-readable instruction product, the mean value and the variance of the extracted image features are predicted through the pre-training estimation network to obtain the training predicted mean value and the training predicted variance of the image features. Then, according to the training predicted mean value and the statistical mean value, the estimated loss value of the training predicted variance and the statistical variance is calculated, and the network parameter adjustment is performed on the estimation network based on the estimated loss value, so that the estimation network may estimate the corresponding mean value and the variance for the sample images of different application scenarios, improving the generalization capability of the network, and helping to improve the accuracy of living body detection for to-be-tested images in different data domains. In addition, during performing standardization processing, standardization processing is performed on the image features by further combining the network parameters used for performing standardization processing in the estimation network with the predicted mean value and the predicted variance. Because the network parameters in the estimation network are parameters obtained after model training, the obtained standardized features are more conducive to living body detection and improve the accuracy of performing living body detection on the to-be-tested image.

Figure 17:
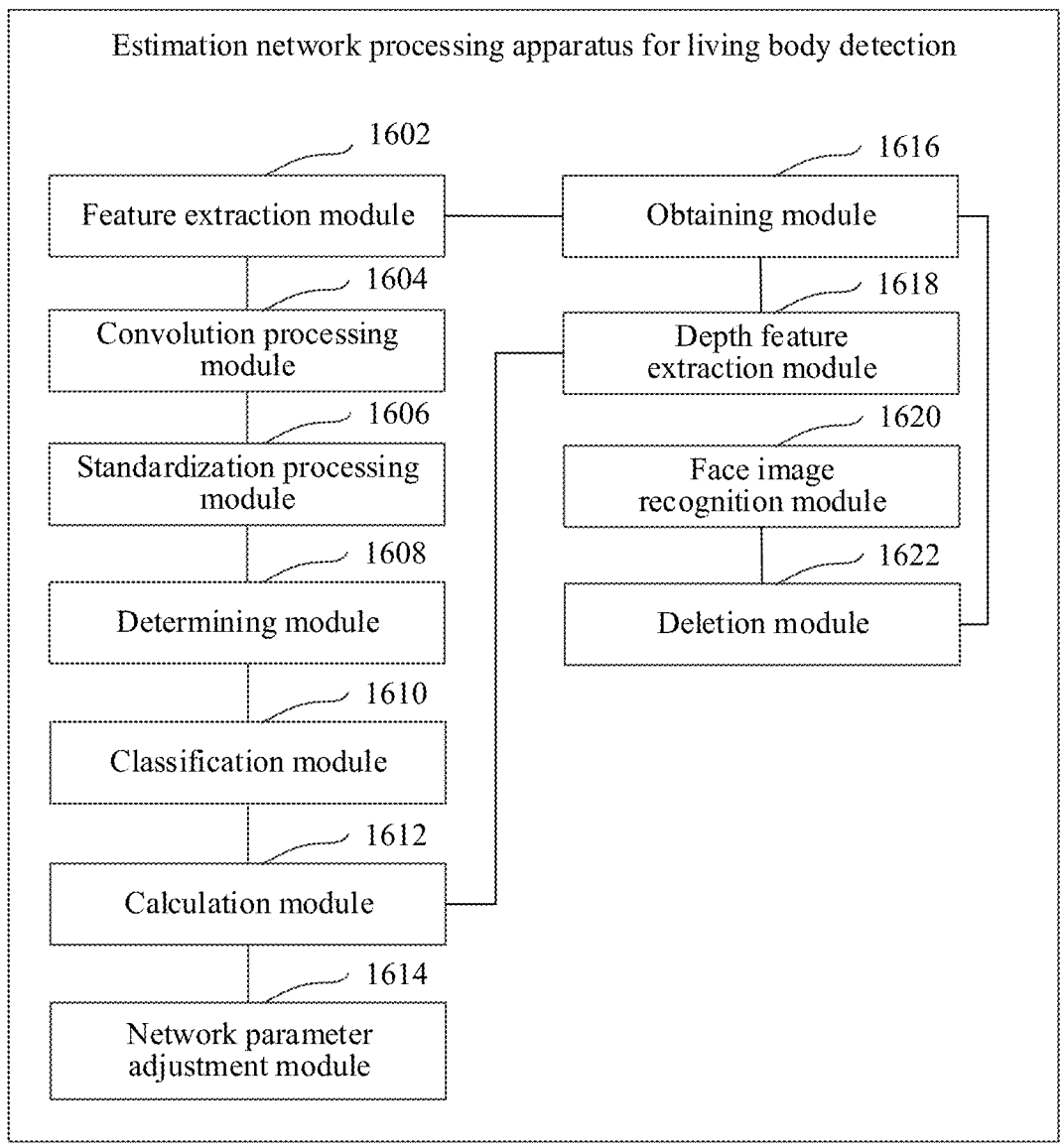
FIG. 17 is a structural block diagram of an estimation network processing apparatus for living body detection according to another embodiment.

In an embodiment, as shown in FIG. 17, the apparatus further includes a standardization processing module 1606, a classification module 1610, a calculation module 1612, and a network parameter adjusting module 1614.

The standardization processing module 1606 is further configured to perform standardization processing on the training image features based on the predicted mean value, the predicted variance, and network parameters used for performing standardization processing on the pre-training estimation network to obtain standardized training features. The classification module 1610 is configured to input the normalized training features into a pre-training classifier, to cause the pre-training classifier to perform classification on the sample images based on the standardized training features to obtain a sample classification probability. The calculation module 1612 is further configured to perform calculation on the sample classification probability and a label of the sample image to obtain a classification loss value. The network parameter adjusting module 1614 is further configured to perform network parameter adjustment on the pre-training classifier and the estimation network based on the classification loss value.

In an embodiment, the apparatus further includes an obtaining module 1616, a depth feature extraction module 1618, a calculation module 1612, and a network parameter adjusting module 1614.

The obtaining module 1616 is further configured to obtain a depth map label of the sample image. The depth feature extraction module 1618 is configured to perform depth feature extraction on the standardized training features to obtain a depth feature map. The calculation module 1612 is further configured to perform calculation on the depth feature map and the depth map label to obtain a depth map loss value. The network parameter adjusting module 1614 is further configured to perform network parameter adjustment on the pre-training estimation network based on the depth map loss value and the estimated loss value.

In an embodiment, the sample image includes the living body sample image and the non-living body sample image; the obtaining module 1616 is further configured to perform depth map calculation on the sample image to obtain the depth map label in a case that the sample image is the living body sample image; and in a case that the sample image is the non-living body sample image, generate a black base image with a same size as the sample image and using the black base image as the depth map label.

In an embodiment, the apparatus further includes a face recognition module 1620, a deletion module 1622, and an obtaining module 1616.

The face recognition module 1620 is configured to perform face recognition on the sample image to obtain a target region including face features. The deletion module 1622 is configured to delete, in the sample image, an image region outside the target region. The obtaining module 1616 is further configured to obtain a depth map label of the sample image after deleting the image region.

For an exemplary limit on the estimation network processing apparatus for living body detection, reference may be made to the limit on the estimation network processing method for living body detection. Details are not described herein again. The modules in the foregoing estimation network processing apparatus for living body detection may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an embodiment, a computer device is provided. The computer device may be a service device, and an internal structure diagram thereof may be shown in FIG. 18. The computer device includes processing circuitry (such as a processor), a memory, and a network interface connected through a system bus. The processor of the computer device is configured to provide computing and control capabilities. The memory of the computer device includes a non-volatile storage medium and an internal memory. The non-volatile storage medium stores an operating system, a computer-readable instruction, and a database. The internal memory provides an environment for running of the operating system and the computer-readable instruction in the non-volatile storage medium. The database of the computer device is configured to store living body detection data. The network interface of the computer device is configured to communicate with an external terminal through a network connection. When executed by a processor, the computer-readable instruction implements a living body detection method.

Figure 18:
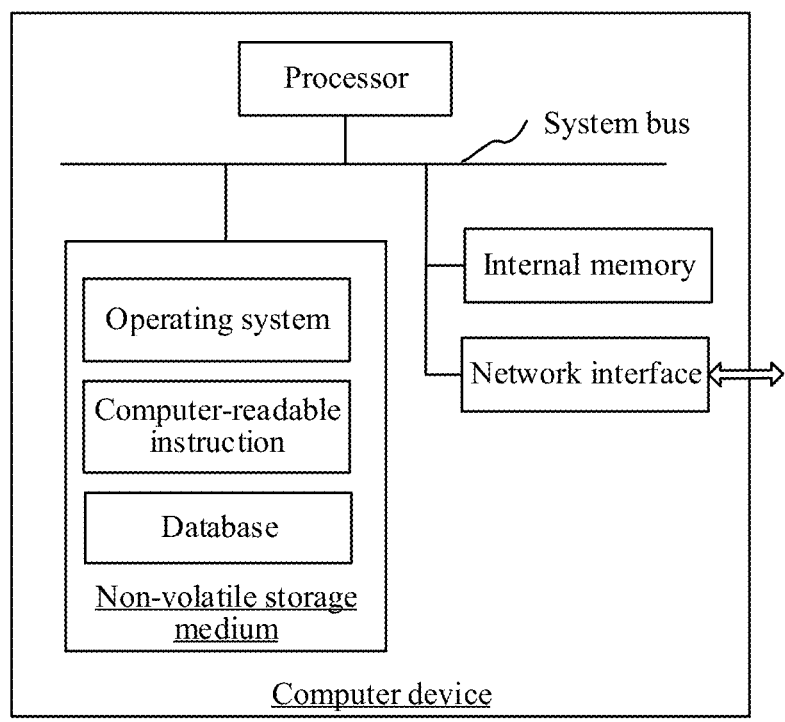
FIG. 18 is an internal structure diagram of a computer device according to an embodiment.

A person skilled in the art may understand that the structure shown in FIG. 18 is only a block diagram of an exemplary structure related to the solution of this disclosure, and does not limit the computer device to which the solution of this disclosure is applied. The computer device may include more or fewer components than those shown in the figure, or some components may be combined, or a different component configuration is used.

In an embodiment, a computer device is further provided, including a memory and a processor, the memory storing computer-readable instructions, the computer-readable instructions, when executed by the processor, causing the processor to implement the steps of the foregoing method embodiments.

In an embodiment, a computer-readable storage medium such as a non-transitory computer-readable storage medium is provided, storing computer-readable instructions, the computer-readable instructions, when executed by a processor, implement the steps in the method embodiments.

In an embodiment, a computer-readable instruction product is provided. The computer-readable instruction product includes computer-readable instructions, and the computer-readable instructions are stored in a computer-readable storage medium. A processor of a computer device reads the computer instructions from the computer-readable storage medium and executes the computer instructions to cause the computer device to perform the steps of the foregoing method embodiments.

A person of ordinary skill in the art may understand that some or all procedures in the method in the foregoing embodiments may be implemented by a computer-readable instruction instructing related hardware. The computer-readable instruction may be stored in a non-volatile computer-readable storage medium, and when the computer-readable instruction is executed, the procedures in the foregoing method embodiments may be implemented. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, or an optical memory. The volatile memory may include a random access memory (RAM) or an external cache memory. As a description and not a limit, the RAM may be in a plurality of forms, such as a static random access memory (SRAM) or a dynamic random access memory (DRAM).

Technical features of the foregoing embodiments may be combined in various manners. To make description concise, not all possible combinations of the technical features in the foregoing embodiments are described. However, other combinations of these technical features shall be considered as falling within the scope of this disclosure.

The foregoing embodiments only describe several implementations of this disclosure, which are described specifically and in detail, but should not be construed as a limitation to the scope of the present disclosure. For a person of ordinary skill in the art, several transformations and improvements can be made without departing from the idea of this disclosure. These transformations and improvements belong to the scope of this disclosure.

What is claimed is:

1. A liveness detection method, comprising:
    extracting image features from an image of a user;
    performing convolution processing on the image features through an estimation network to obtain a predicted mean value and a predicted variance of the image features;
    performing standardization processing on the image features based on the predicted mean value, the predicted variance, and predetermined network parameters of the standardization processing to obtain standardized features; and
    determining whether the image of the user includes a living body image according to a liveness classification probability of a classification performed on the image of the user based on the standardized features, wherein
    the predetermined network parameters include linear transformation parameters and translation parameters, and
    the performing the standardization processing on the image features comprises:
        performing normalization processing on the image features according to the predicted mean value and the predicted variance to obtain normalized features; and
        performing affine transformation on the normalized features based on the linear transformation parameters and the translation parameters to obtain the standardized features.

2. The method according to claim 1, wherein the performing the standardization processing on the image features comprises:

obtaining a statistical mean value and a statistical variance of training image features extracted from sample images;

performing a weighted calculation on the predicted mean value and the statistical mean value to obtain a weighted mean value;

performing a weighted calculation on the predicted variance and the statistical variance to obtain a weighted variance; and performing the standardization processing on the image features based on the weighted mean value, the weighted variance, and the network parameters to obtain the standardized features.

3. The method according to claim 1, wherein the determining whether the image of the user includes the living body image comprises:

inputting the standardized features into a classifier that is configured to perform classification on the image of the user based on the standardized features to obtain the liveness classification probability;

determining that the image of the user includes the living body image when the liveness classification probability is equal to or greater than a preset threshold; and determining that the image of the user includes a non-living body image when the liveness classification probability is less than the preset threshold.

4. The method according to claim 1, wherein the image of the user is captured by a terminal in response to an interaction request, and the method further comprises at least one of:

when the interaction request includes a resource account registration request and the image of the user includes the living body image, generating resource account information, and sending the resource account information to the terminal;

when the interaction request includes a resource transfer request and the image of the user includes the living body image, transferring a specified amount of resources in the resource transfer request; or when the interaction request includes a request for turning on an access switch and the image of the user includes the living body image, turning on the access switch.

5. The method according to claim 1, further comprising:

performing feature extraction on sample images in different data domains to obtain training image features;

performing convolution processing on the training image features through a pre-training estimation network to obtain a training predicted mean value and a training predicted variance corresponding to the training image features;

determining an estimated loss value based on the training predicted mean value, a statistical mean value of the training image features, the training predicted variance, and a statistical variance of the training image features; and performing network parameter adjustment on the pre-training estimation network based on the estimated loss value to obtain the estimation network.

6. The method according to claim 5, wherein the different data domains include different image capture conditions.

7. The method according to claim 5, further comprising:

performing standardization processing on the training image features based on the predicted mean value, the predicted variance, and initial network parameters of the standardization processing performed by the pre-training estimation network to obtain standardized training features;

inputting the standardized training features into a pre-training classifier that is configured to perform classification on the sample images based on the standardized training features to obtain a sample classification probability; and determining a classification loss value based on the sample classification probability and a label of the sample image, wherein the performing the network parameter adjustment includes performing the network parameter adjustment on the pre-training classifier and the estimation network based on the classification loss value and the estimated loss value.

8. The method according to claim 7, further comprising:

obtaining a depth map label of the sample image;

performing depth feature extraction on the standardized training features to obtain a depth feature map; and determining a depth map loss value based on the depth feature map and the depth map label; and the performing the network parameter adjustment on the pre-training estimation network includes performing the network parameter adjustment on the pre-training estimation network based on the depth map loss value and the estimated loss value.

9. The method according to claim 8, wherein the sample image includes one of a living body sample image and a non-living body sample image; and the obtaining the depth map label of the sample image comprises:

obtaining the depth map label according to a depth map calculation on the sample image to when the sample image includes the living body sample image; and obtaining the depth map label according to a black base image having a same size as the sample image when the sample image includes the non-living body sample image.

10. The method according to claim 8, further comprising:

performing face recognition on the sample image to obtain a target region including face features; and obtaining the depth map label of the sample image based on the target region.

11. A liveness detection system, comprising:

processing circuitry configured to extract image features from an image of a user;

perform convolution processing on the image features through an estimation network to obtain a predicted mean value and a predicted variance of the image features;

perform standardization processing on the image features based on the predicted mean value, the predicted variance, and predetermined network parameters of the standardization processing to obtain standardized features; and determine whether the image of the user includes a living body image according to a liveness classification probability of a classification performed on the image of the user based on the standardized features, wherein the predetermined network parameters include linear transformation parameters and translation parameters, and to perform the standardization processing, the processing circuitry is configured to:

perform normalization processing on the image features according to the predicted mean value and the predicted variance to obtain normalized features; and perform affine transformation on the normalized features based on the linear transformation parameters and the translation parameters to obtain the standardized features.

12. The liveness detection system according to claim 11, wherein the processing circuitry is configured to:

obtain a statistical mean value and a statistical variance of training image features extracted from sample images;

perform a weighted calculation on the predicted mean value and the statistical mean value to obtain a weighted mean value;

perform a weighted calculation on the predicted variance and the statistical variance to obtain a weighted variance; and perform the standardization processing on the image features based on the weighted mean value, the weighted variance, and the network parameters to obtain the standardized features.

13. The liveness detection system according to claim 11, wherein the processing circuitry is configured to:

input the standardized features into a classifier that is configured to perform classification on the image of the user based on the standardized features to obtain the liveness classification probability;

determine that the image of the user includes the living body image when the liveness classification probability is equal to or greater than a preset threshold; and determine that the image of the user includes a non-living body image when the liveness classification probability is less than the preset threshold.

14. The liveness detection system according to claim 11, wherein the image of the user is captured by a terminal in response to an interaction request, and the processing circuitry is configured to perform at least one of:

when the interaction request includes a resource account registration request and the image of the user includes the living body image, generate resource account information, and send the resource account information to the terminal;

when the interaction request includes a resource transfer request and the image of the user includes the living body image, transfer a specified amount of resources in the resource transfer request; or when the interaction request includes a request for turning on an access switch and the image of the user includes the living body image, turn on the access switch.

15. The liveness detection system according to claim 11, wherein the processing circuitry is configured to:

perform feature extraction on sample images in different data domains to obtain training image features;

perform convolution processing on the training image features through a pre-training estimation network to obtain a training predicted mean value and a training predicted variance corresponding to the training image features;

determine an estimated loss value based on the training predicted mean value, a statistical mean value of the training image features, the training predicted variance, and a statistical variance of the training image features; and perform network parameter adjustment on the pre-training estimation network based on the estimated loss value to obtain the estimation network.

16. The liveness detection system according to claim 15, wherein the different data domains include different image capture conditions.

17. The liveness detection system according to claim 15, wherein the processing circuitry is configured to:

perform standardization processing on the training image features based on the predicted mean value, the predicted variance, and initial network parameters of the standardization processing performed by the pre-training estimation network to obtain standardized training features;

input the standardized training features into a pre-training classifier that is configured to perform classification on the sample images based on the standardized training features to obtain a sample classification probability;

determine a classification loss value based on the sample classification probability and a label of the sample image; and perform the network parameter adjustment on the pre-training classifier and the estimation network based on the classification loss value and the estimated loss value.

18. A non-transitory computer-readable storage medium, storing instructions which when executed by a processor cause the processor to perform:

extracting image features from an image of a user;

performing convolution processing on the image features through an estimation network to obtain a predicted mean value and a predicted variance of the image features;

performing standardization processing on the image features based on the predicted mean value, the predicted variance, and predetermined network parameters of the standardization processing to obtain standardized features; and determining whether the image of the user includes a living body image according to a liveness classification probability of a classification performed on the image of the user based on the standardized features, wherein the predetermined network parameters include linear transformation parameters and translation parameters, and the performing the standardization processing on the image features comprises:

performing normalization processing on the image features according to the predicted mean value and the predicted variance to obtain normalized features; and performing affine transformation on the normalized features based on the linear transformation parameters and the translation parameters to obtain the standardized features.

* * * * *